UNITED STATES PATENT OFFICE.

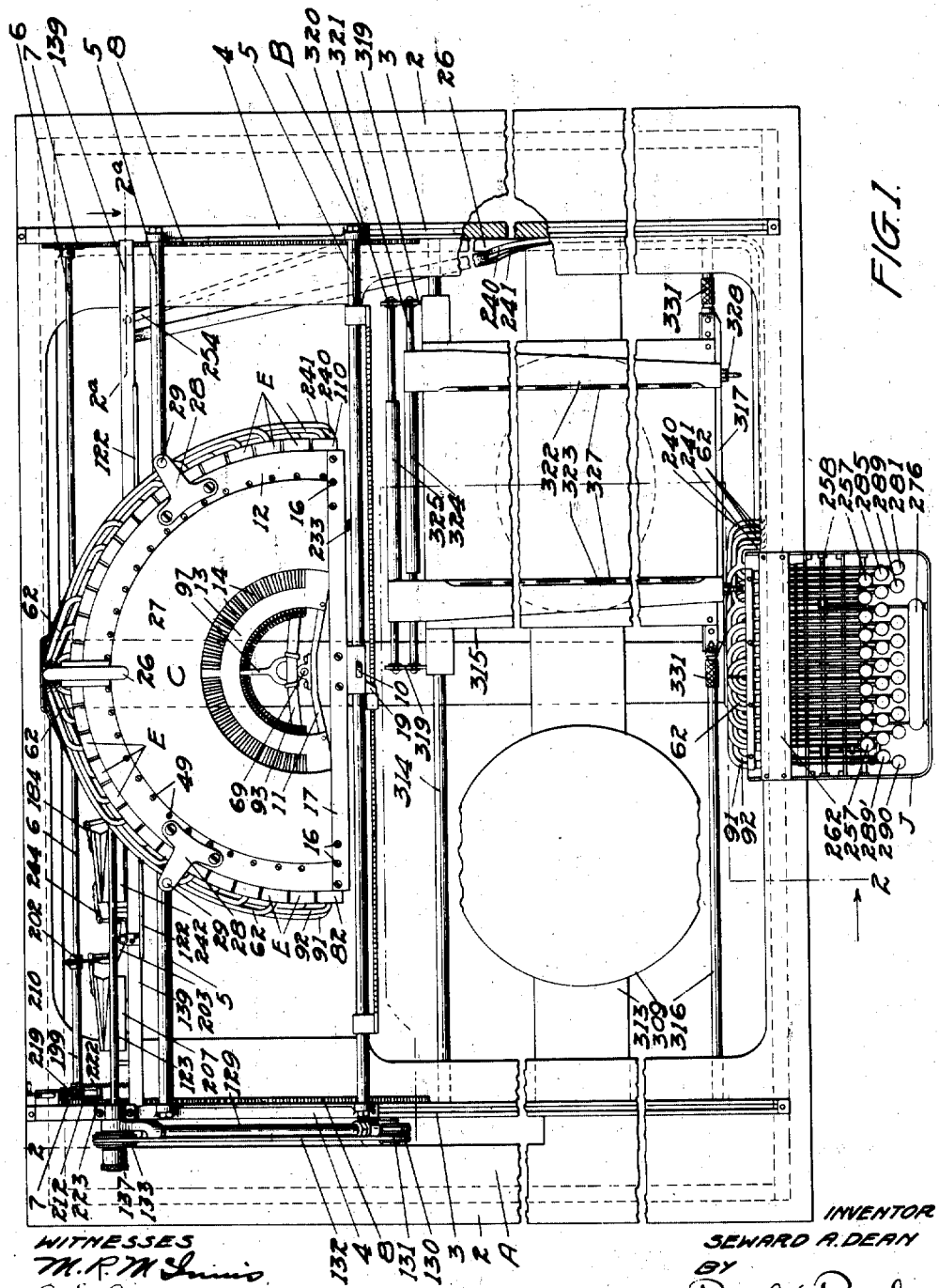

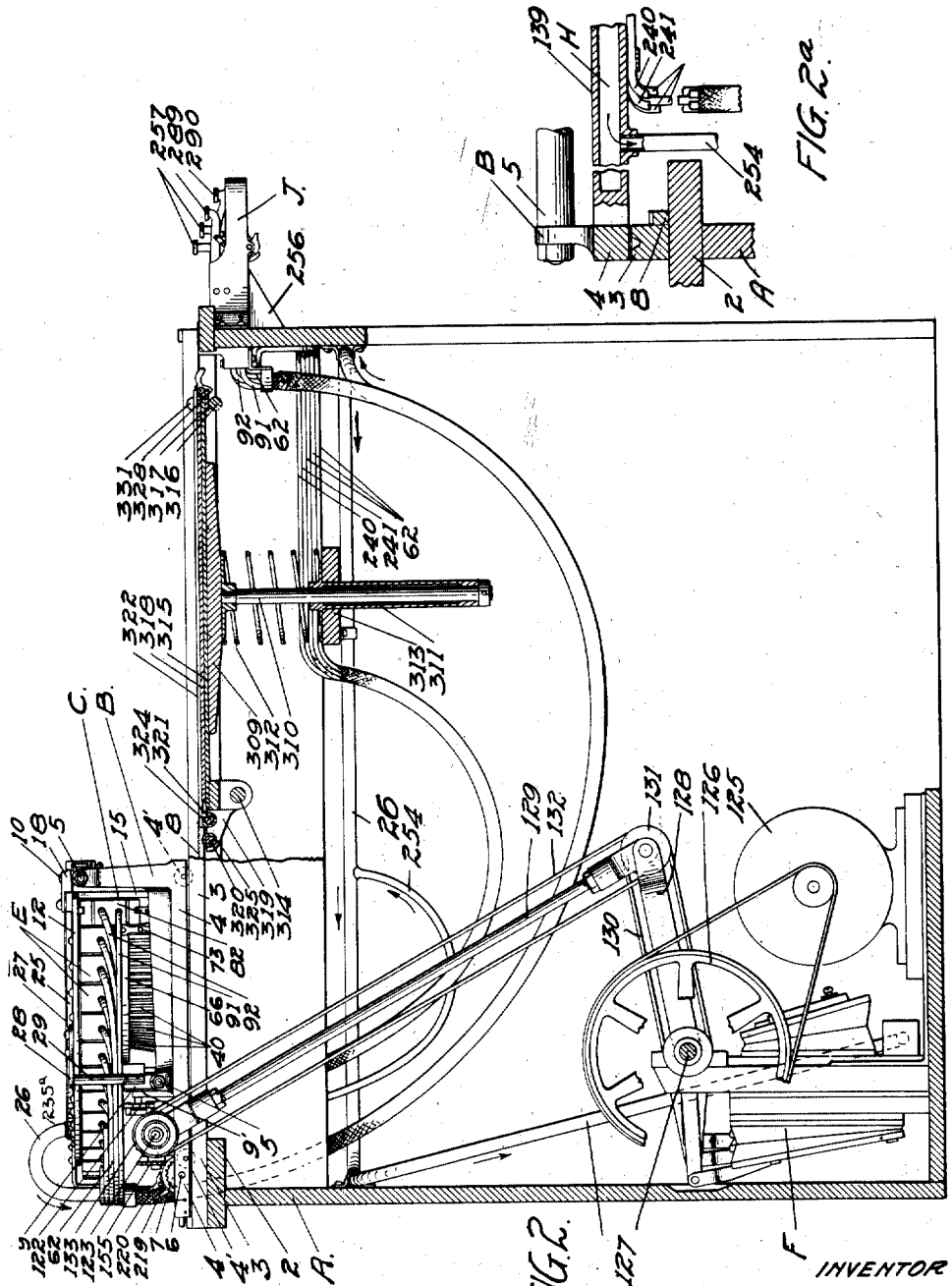

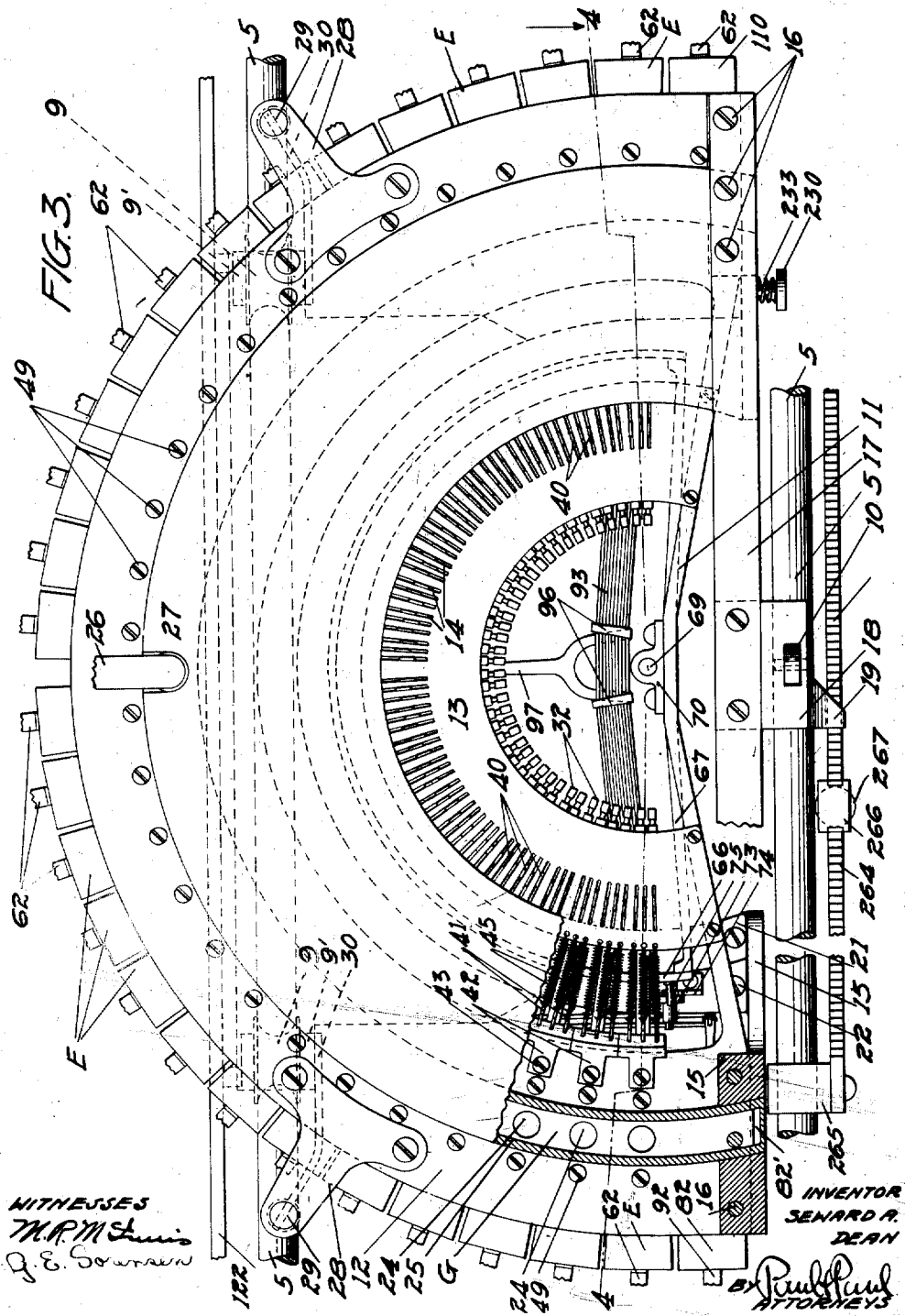

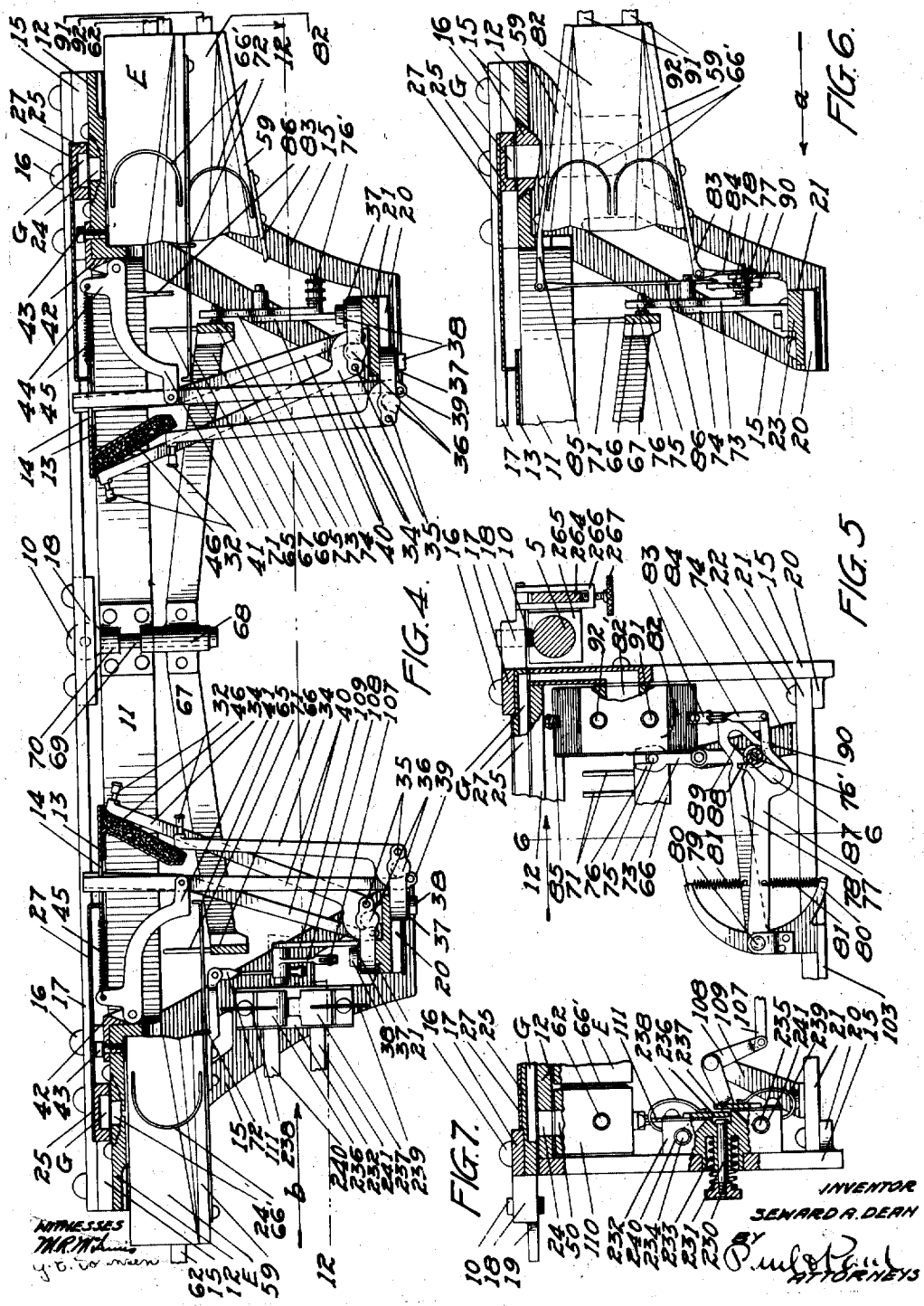

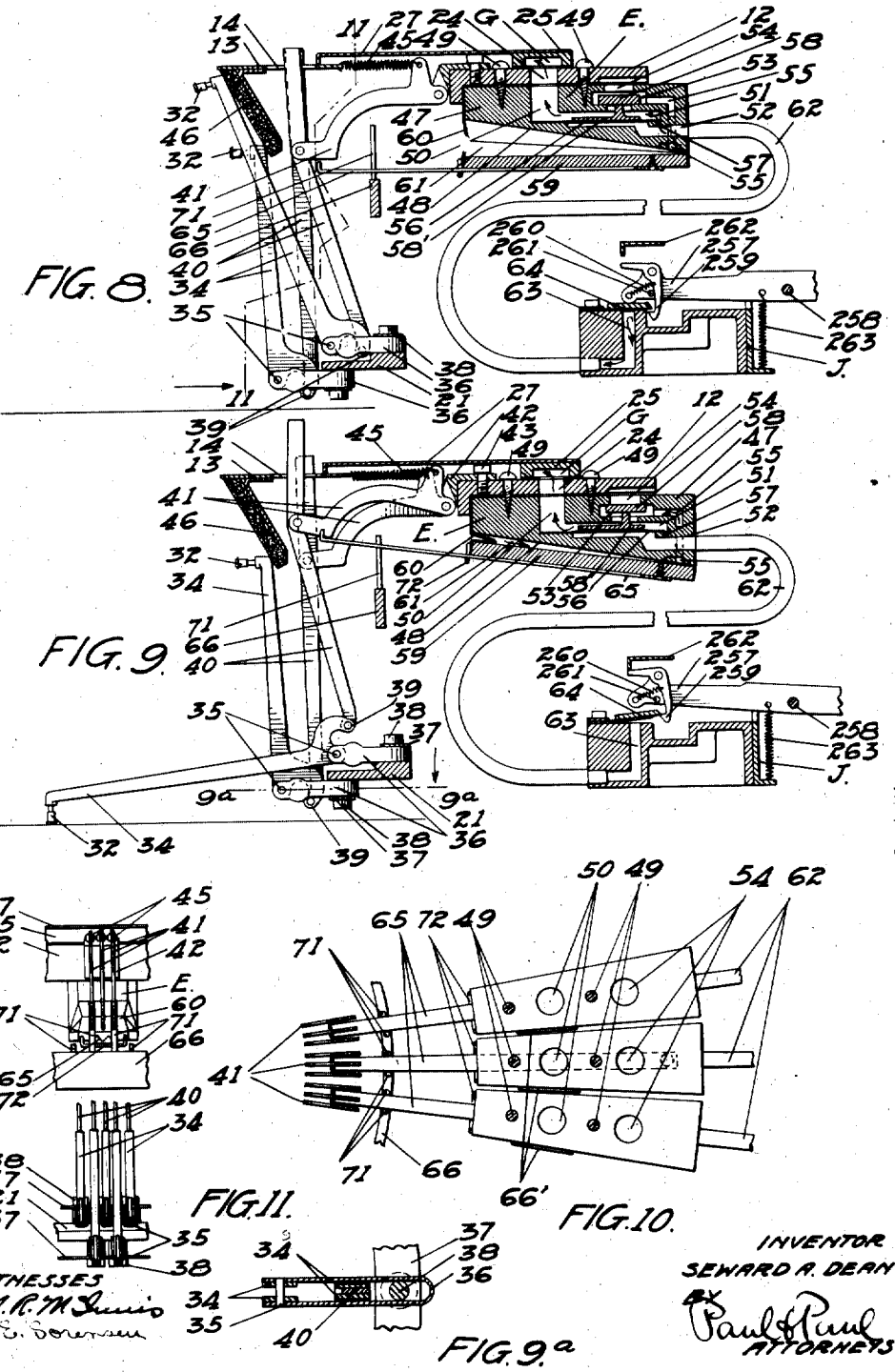

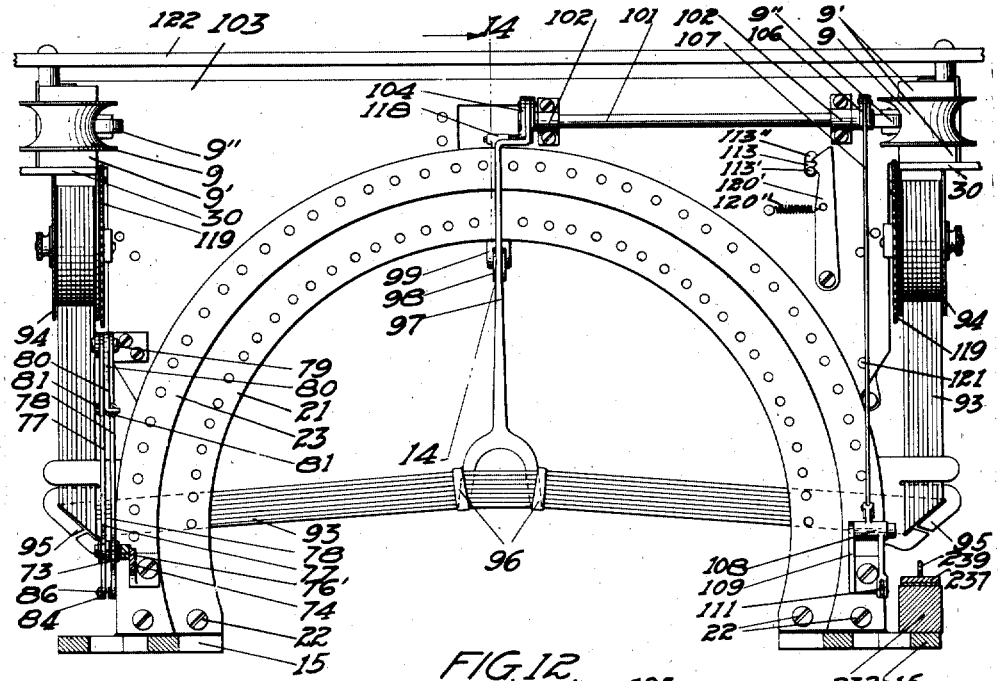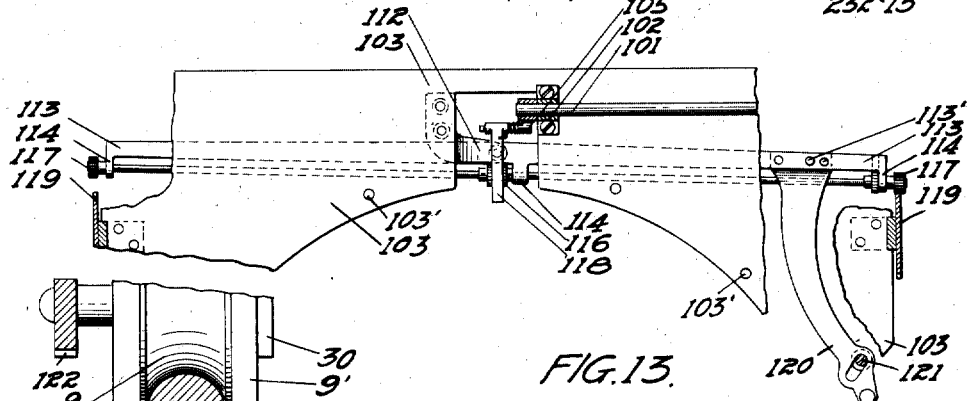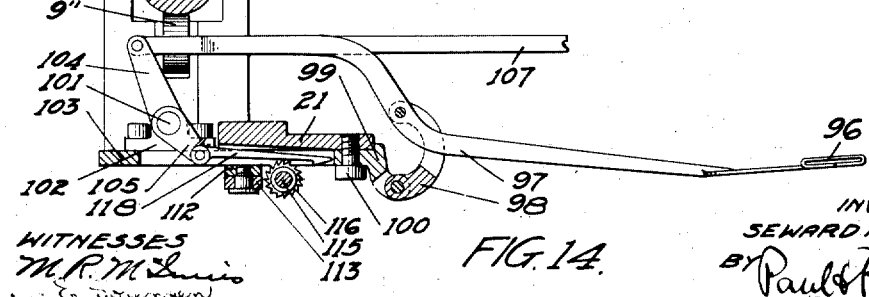

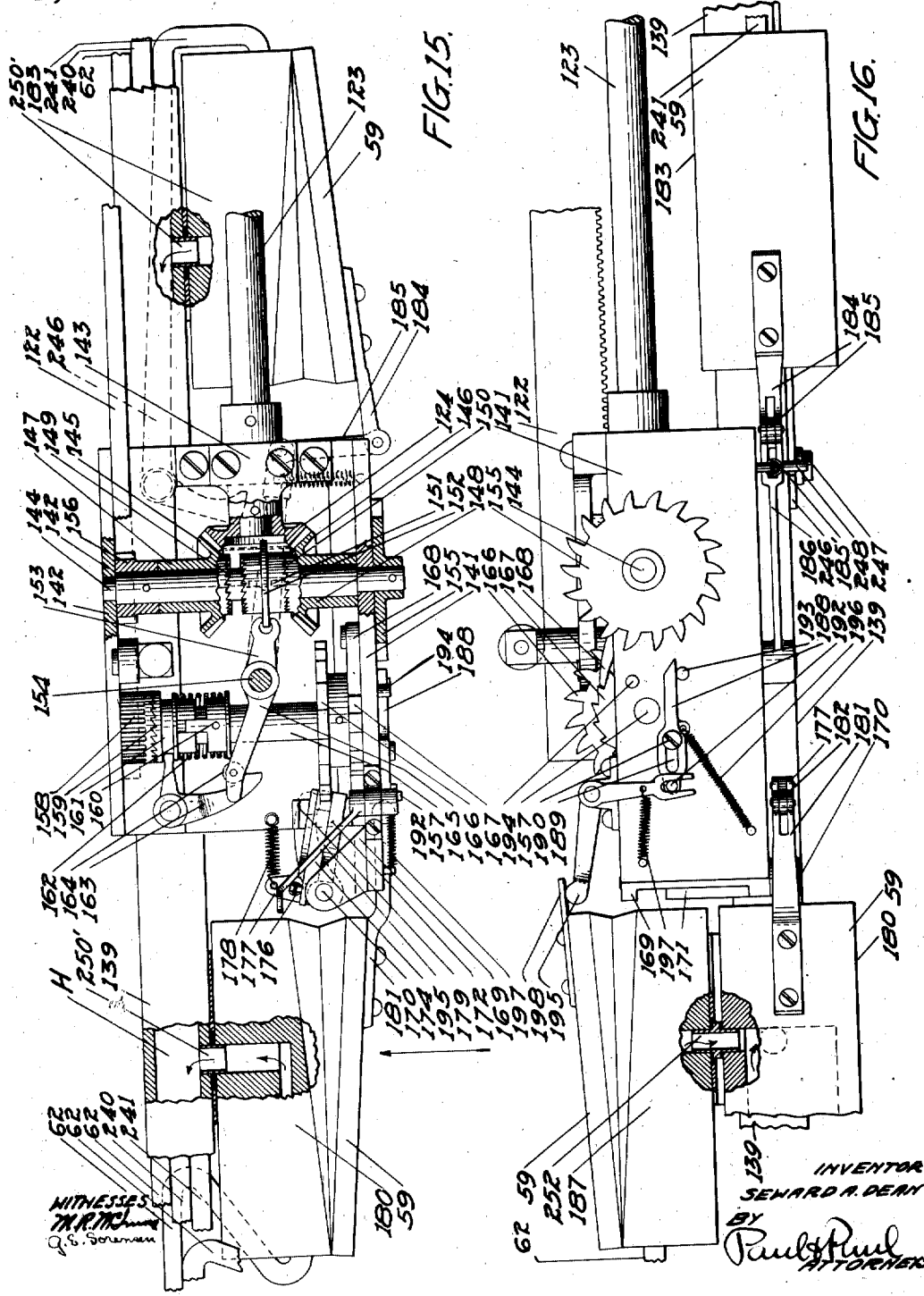

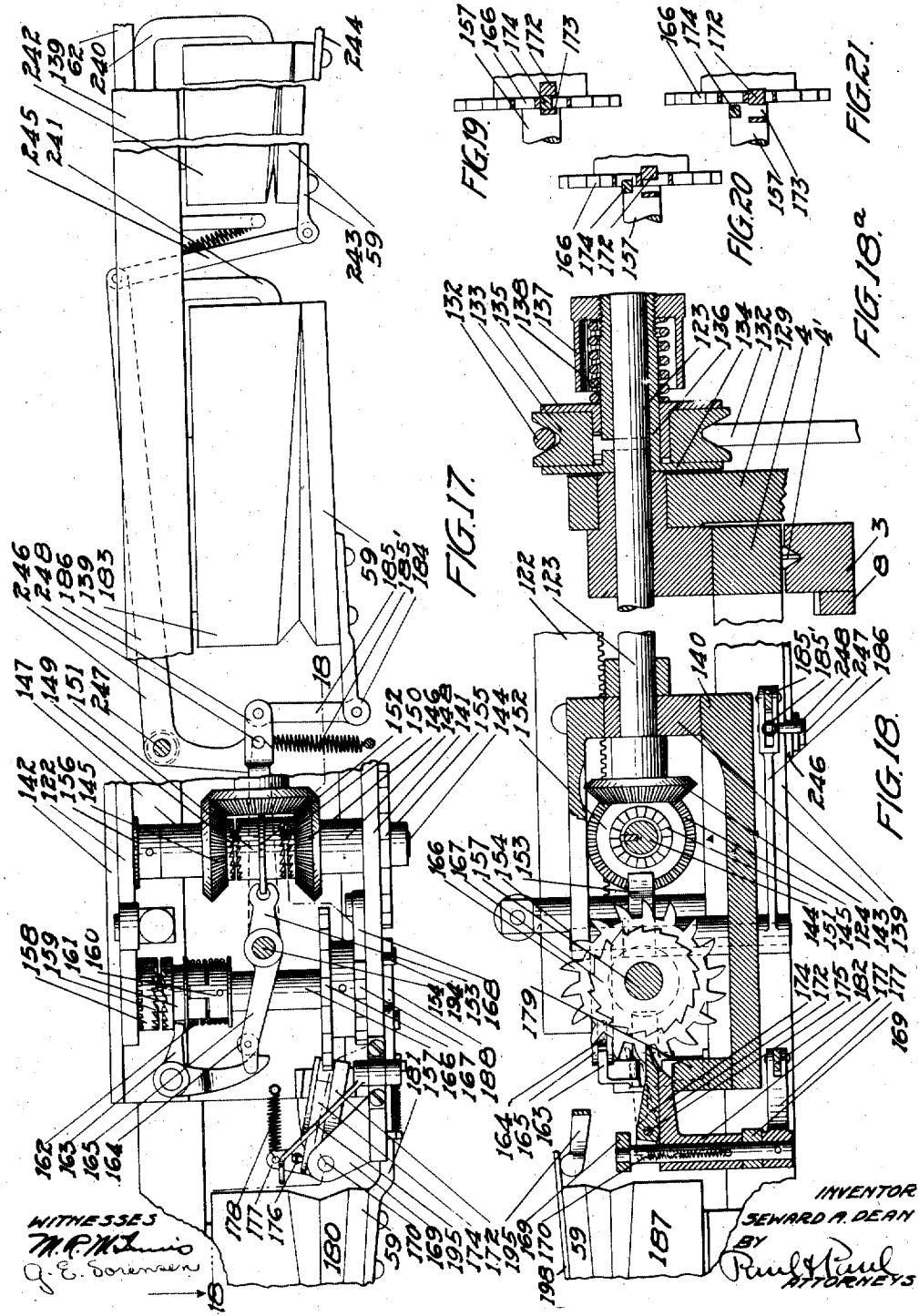

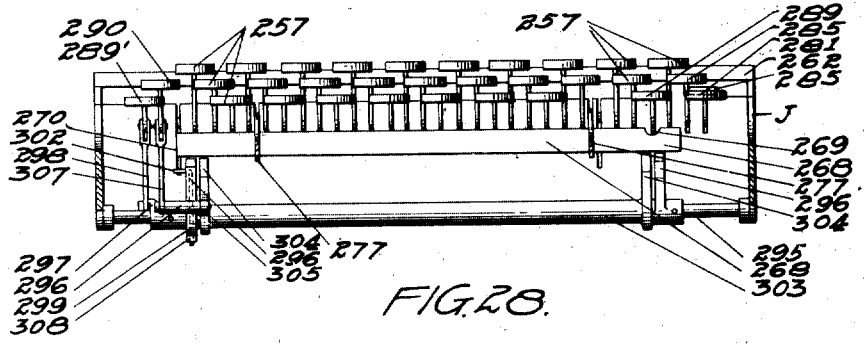
FIG. 28.
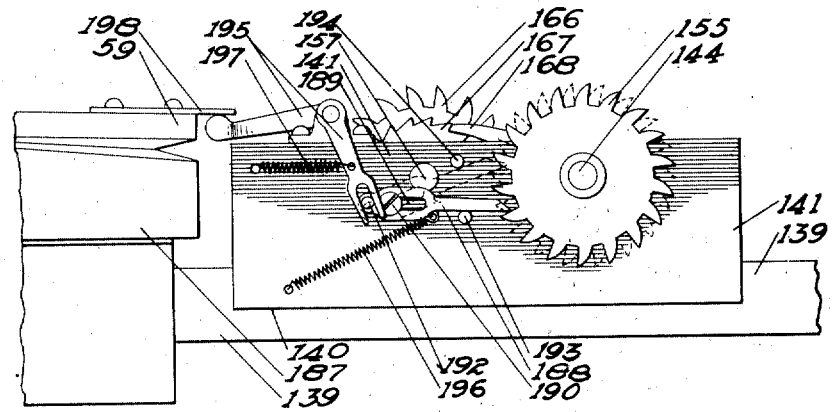
FIG. 22.
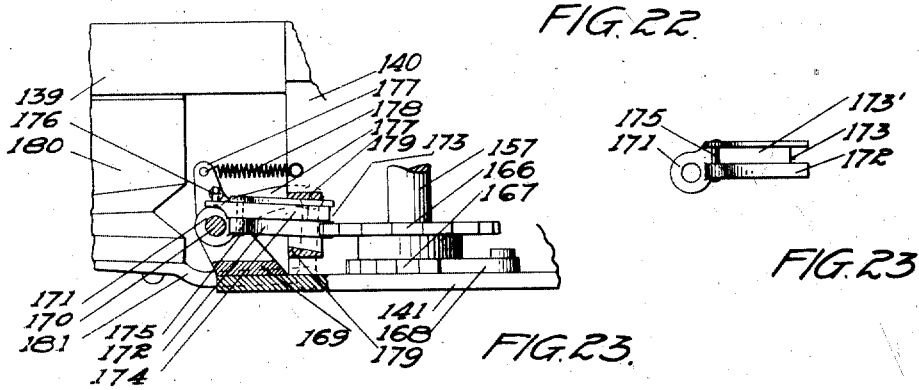
FIG. 23. FIG. 23.ᵃ
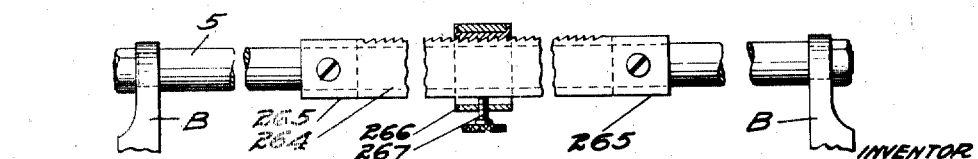
FIG. 41.

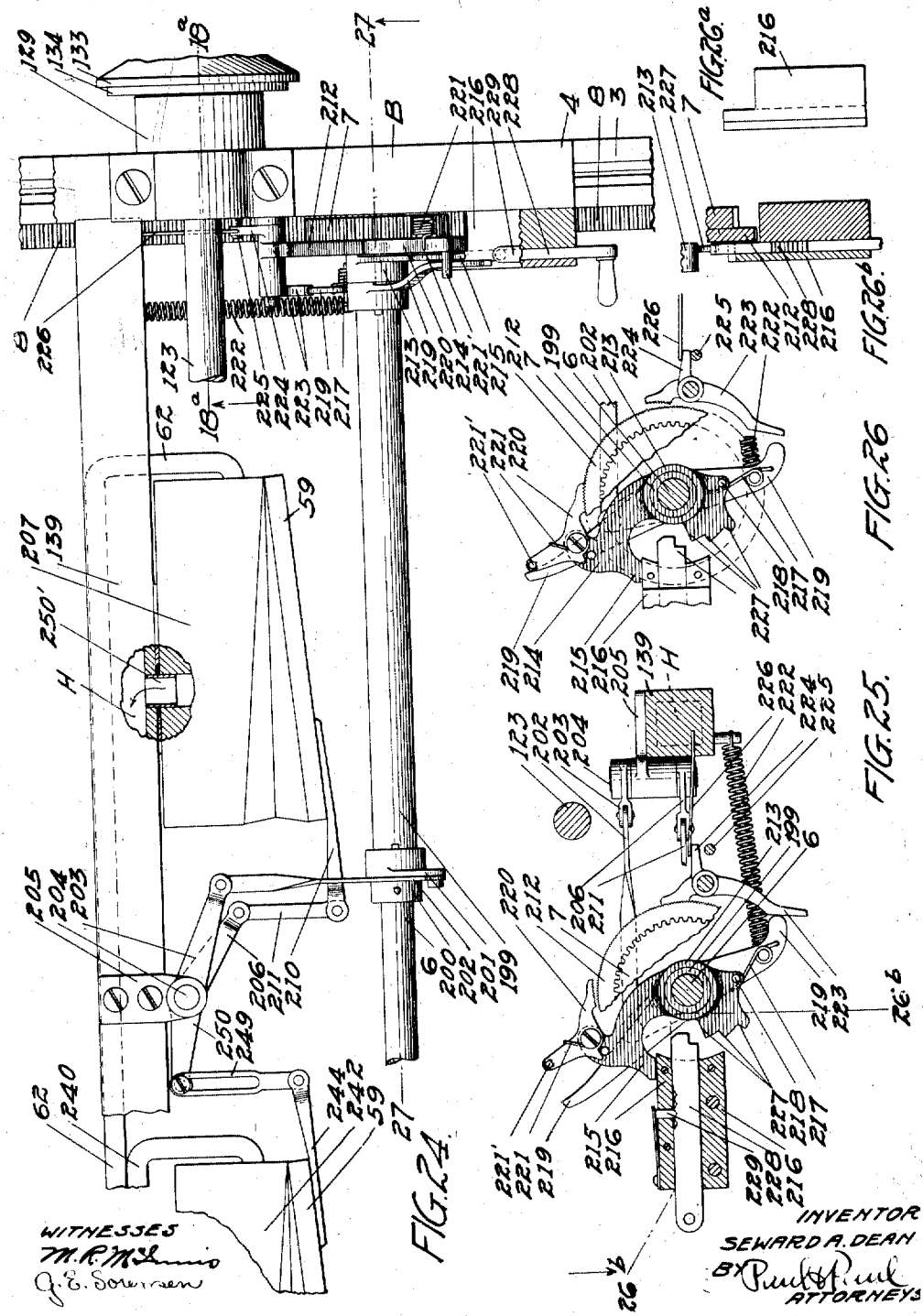

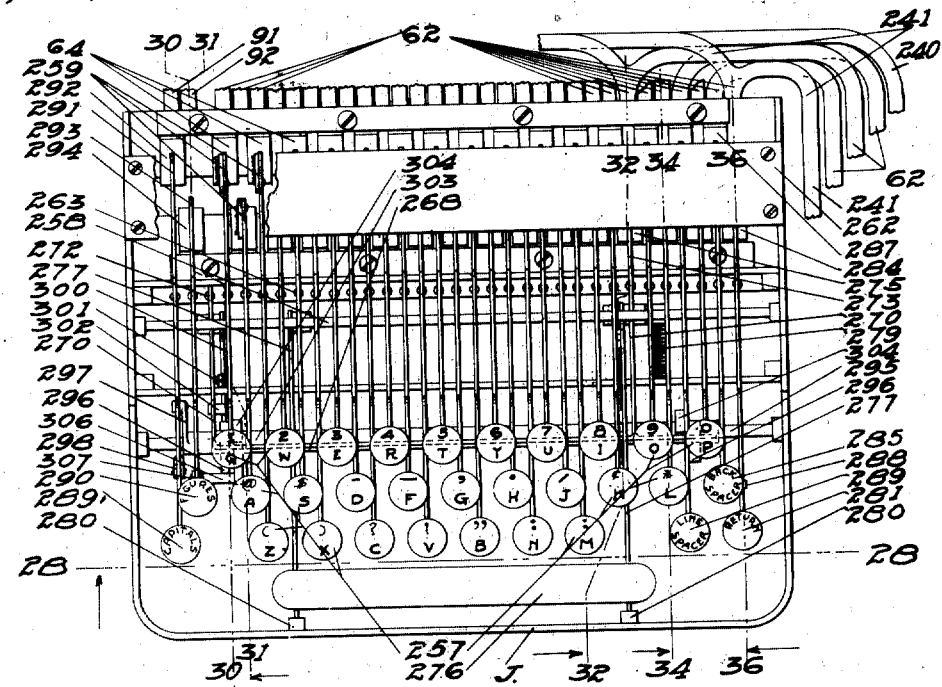
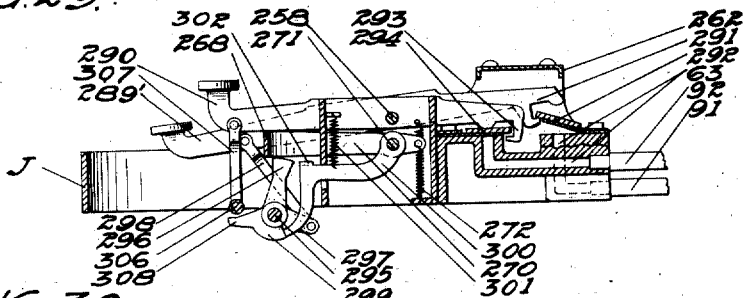
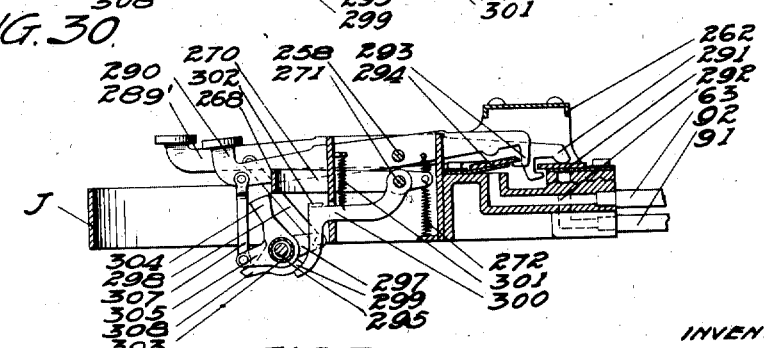

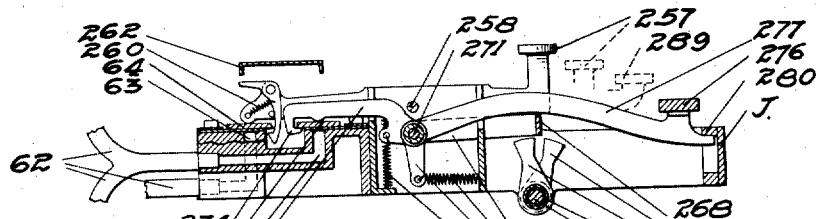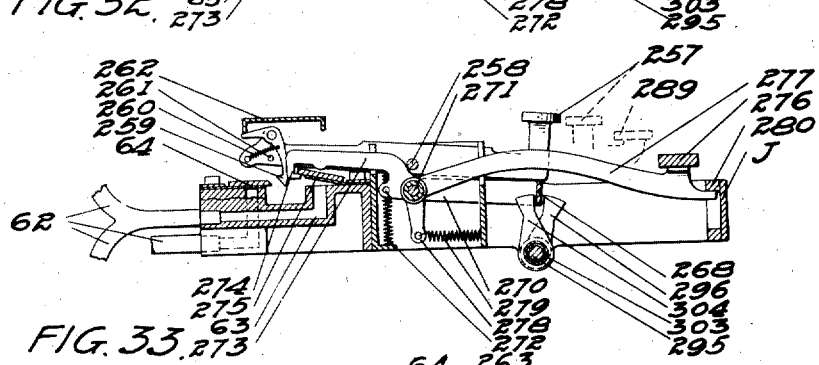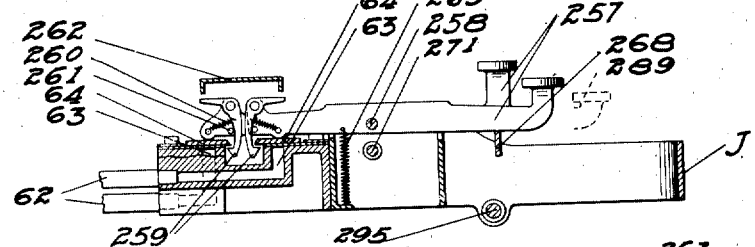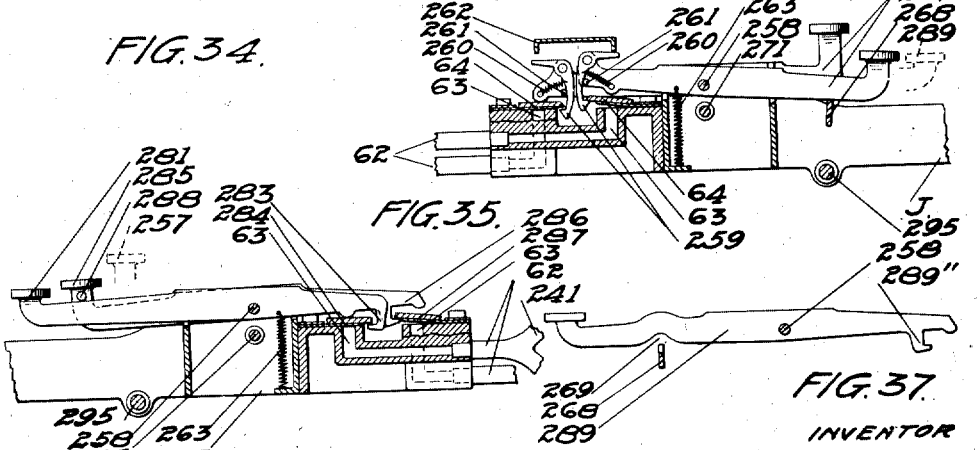

SEWARD A. DEAN, OF HASTINGS, MINNESOTA, ASSIGNOR TO S. A. DEAN COMPANY, OF MINNEAPOLIS, MINNESOTA, A CORPORATION OF MINNESOTA.

TYPE-WRITER.

1,246,561.  Specification of Letters Patent.  Patented Nov. 13, 1917.

Application filed January 12, 1915. Serial No. 1,784.

*To all whom it may concern:*

Be it known that I, SEWARD A. DEAN, a citizen of the United States, and resident of Hastings, Dakota county, Minnesota, have invented certain new and useful Improvements in Type-Writers, of which the following is a specification.

This invention relates to improvements in typewriters designed particularly for use in billing and writing in bound books, though capable also of use generally as a typewriting machine.

The principal object of the invention is to provide a typewriting machine that employs a stationary keyboard with a movable main carriage, and a movable type carriage, with a pneumatic connection between the keyboard and said carriages whereby the type are operated and other functions of the machine are performed mainly by pneumatic power under control of the operator.

The invention consists generally in the constructions and combinations hereinafter described and particularly pointed out in the claims.

In the accompanying drawings forming part of this specification,

Figure 1 is a plan view of a typewriter embodying my invention,

Fig. 2 is a longitudinal, vertical section of the same, the section being taken substantially on line 2—2 of Fig. 1, Fig. 2ª is a detail section taken on line 2ª—2ª of Fig. 1, Fig. 3 is a plan view of the type carriage, and parts carried thereby, partly in section.

Fig. 4 is a transverse section of the type carriage on the line 4—4 of Fig. 3, looking toward the front of the machine in the direction of the arrow, the inking ribbon and supporting parts being omitted, Fig. 5 is a detail elevation of the means for operating the type shifter, the view being taken looking in the direction of arrow *a* in Fig. 6, and shown partly in section, Fig. 6 is a detail elevation of the same portion of the mechanism, taken on line 6—6 of Fig. 5, looking in the direction of the arrow.

Fig. 7 is a detail elevation looking in the direction of the arrow *b* in Fig. 4, parts of the structure being shown in section.

Fig. 8 is a detail section and partial elevation showing the means for operating the key bars by pneumatic pressure, Fig. 9 is a similar view showing the position of the same parts, with one type bar in printing position, Fig. 9ª is a detail sectional view of the means for connecting the type bars to the supporting ring, taken on line 9ª—9ª of Fig. 9.

Fig. 10 is a plan view showing three of the pneumatic motors by which the type bars are operated, and showing also portions of the type, and the shifting bars.

Fig. 11 is a partial section of the type bars and means for operating the same, the view being taken on line 11—11, looking in the direction of the arrow in Fig. 8.

Fig. 12 is a plan and partial section, taken on line 12—12 of Fig. 4 of a portion of the type carriage, showing the means for supporting and operating the printing ribbon, and the plate to which the type bars are secured, said bars and connections being omitted.

Fig. 13 is a detail plan view of the means for operating the ribbon feed,

Fig. 14 is a section on line 14—14 of Fig. 12, looking in the direction of the arrow, the ribbon spools being omitted, Fig. 15 is a detail plan section of a portion of the mechanism for controlling the movement of the type carriage, Fig. 16 is an elevation of the same parts looking in the direction of the arrow in Fig. 15, Fig. 17 is a plan of substantially the same mechanism that is shown in Fig. 15, but with the parts occupying different positions.

Fig. 18 is a sectional elevation, taken on line 18—18 of Fig. 17.

Fig. 18ª is a section on line 18ª—18ª of Fig. 24, showing driving mechanism for parts shown in Fig. 18.

Figs. 19, 20 and 21 are details of the escapement mechanism shown in Figs. 17 and 18.

Fig. 22 is a side elevation of the parts shown in Fig. 17, showing the same in different positions, Fig. 23 is a detail plan section showing the escapement arm in a different position from that shown in Fig. 15, Fig. 23ª is a detail of an escapement arm, Fig. 24 is a plan of a portion of the main carriage and the means for feeding said carriage for line spacing, Figs. 25 and 26 are details of the means for moving the main carriage.

Figure 27:
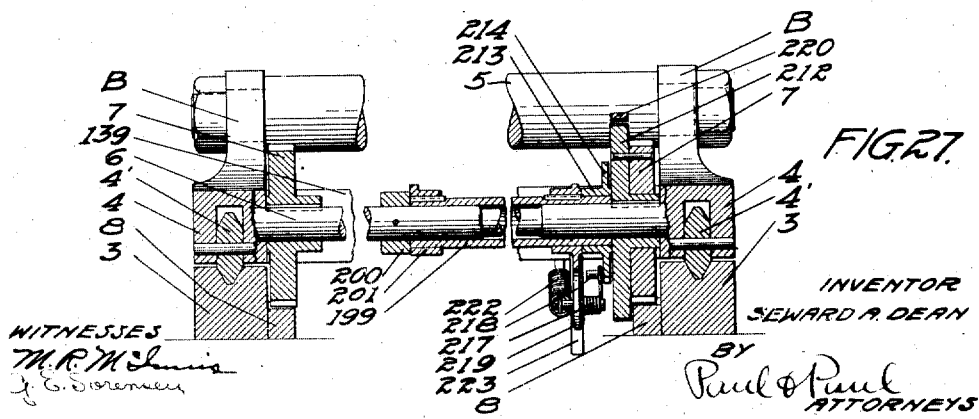

Fig. 26ª is a detail view of the adjustable stop bar and parts coöperating therewith, Fig. 26ᵇ is a section taken on line 26ª—26ª of Fig. 25, Fig. 27 shows the adjustable stop for the type carriage, the section being taken on line 27—27 of Fig. 24, Fig. 28 is a section of the key-board, taken on line 28—28 of Fig. 29, Fig. 29 is a plan view of the key-board, Fig. 30 is a section taken on line 30—30 of Fig. 29, Fig. 31 is a similar section taken on line 31—31, of Fig. 29, Fig. 32 is another section of the key-board, taken on line 32—32 of Fig. 29 showing the universal bar in its normal position, or in position for operation, Fig. 33 is a similar view showing the parts in operation, Fig. 34 is a section taken on line 34—34 of Fig. 29, showing type keys and valves in normal position.

Fig. 35 is a similar view with one of the keys in operation.

Figure 38:
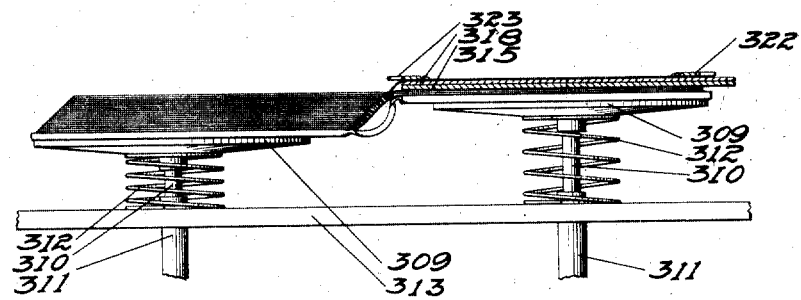
Figure 39:
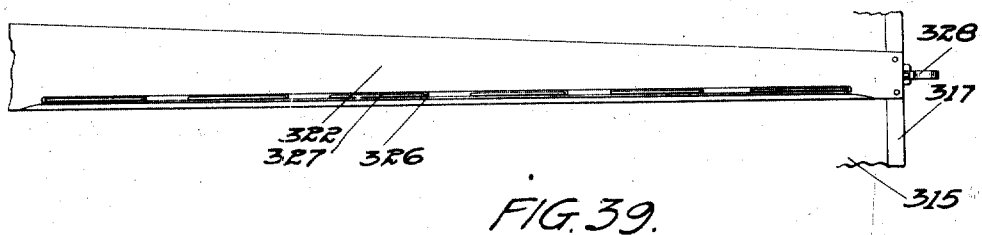
Figure 40:
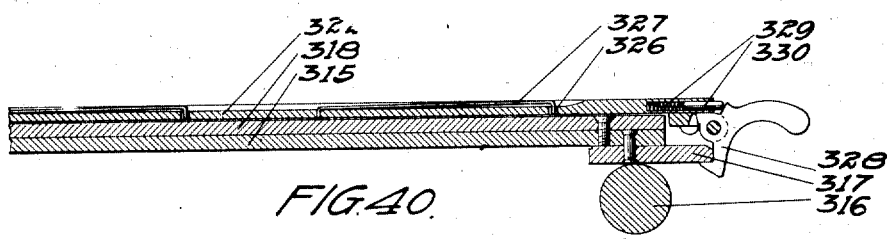

Fig. 36 is a section taken on line 36—36 of Fig. 29,

Fig. 37 is a detail of the line spacing key,

Fig. 38 is an elevation of the book holder, partially in section,

Figs. 39 and 40 are details of the paper holder.

Fig. 41 illustrates the stop for the type carriage.

In the drawings, A represents the main frame or table of the machine. B represents the main carriage, taken as a whole, C the type head or carriage, taken as a whole, and D the book or paper holder, and E the motor for operating the type bars and the air pump. These devices constitute the principal elements of the machine, and I will proceed to describe their novel construction and arrangement.

*The main frame or table.*

The main frame or table A may be of any suitable size or construction. It is preferably in the form of a table having a flat top 2 with a large opening in the center thereof. This table is also provided with parallel rails 3, 3, extending from front to back thereof at opposite sides of the opening. This frame or table supports all of the various parts of the mechanism of the machine, and the power device is also preferably located within said frame or table as hereinafter described.

*The main carriage.*

The main carriage B consists preferably of side bars 4, 4, supported by suitable antifriction wheels 4', 4', upon the grooved rails 3, 3. These bars are connected by the transverse rods 5, 5, and the hollow transverse bar 139. Said rods and bar together form a rectangular frame, capable of moving forward and back upon the rails 3, 3. Said carriage is also provided with a transverse shaft 6 having a pinion 7 at each end. These pinions engage rack bars 8, 8, located upon the main frame or table and preferably inside the rails 8, 8, (see Fig. 28). This arrangement of the pinions on the main carriage engaging the teeth of the stationary racks causes the ends of the carriage to move evenly over said rails. The carriage moves freely back and forth over the table, and said carriage is provided with means hereinafter described by which it is fed forward intermittently to provide for line spacing.

*The type carriage.*

The type carriage C consists mainly of a semi-circular frame provided at its rear with grooved wheels 9, 9 (shown by dotted lines in Fig. 3 and by full lines in Fig. 12) which rest and travel upon the rear cross rod 5 of the main frame, and a single central wheel 10 which rests and travels upon the forward cross rod 5.

This carriage is adapted to move freely transversely of the machine upon said rods. As the main carriage moves forward and back upon the rails on the table of the machine and as the type carriage moves in either direction transversely upon the main frame, these movements of the two carriages permit what is known as the "printing point" of the typewriter to be brought over any point on the printing surface of the book or sheet to be operated upon. The main element of the type carriage frame is formed of a semi-circular plate 12 the ends of which are united by a transverse bar 11, preferably formed integrally with said plate 12. The transverse bar 11 preferably extends inwardly as shown in Fig. 3 of the drawings. A substantially semi-circular plate 18 is secured upon the transverse bar 11 and this plate is provided with a series of slots 14 through which the operating links of the key bars extend as hereinafter described. To the ends of the plate 12 depending brackets 15 are secured. The upper ends of the brackets 15 preferably project over the edges of the plate 12 and are secured thereto by suitable screws 16. These screws pass also through a bar 17 extending transversely of the frame of the machine parallel to the cross rod 5 and carry a block 18 in which the wheel 10, supporting the front edge of the carriage, is mounted. This block 18 is also preferably provided with a projection 19 arranged to engage an adjustable stop hereinafter described. The depending arms of the bracket are, for the sake of lightness in construction, preferably made double as shown in Figs. 4 and 6, and they are provided at their lower ends with the inwardly projecting ledges 20 upon which the substantially semi-circular type bar supporting plate 21 is secured, preferably by suitable screws 22. The plate 21 is preferably formed with a raised rim 23 at its rear or outer surface.

Below and in the rear of the plate 21 is a plate 103 (see Figs. 12 and 13). This plate has preferably a straight rear edge and is widest at the back and extends under the grooved wheels 9, 9, that support the rear part of the type carriage on the rear rod 5. Forward of the wheels 9 the plate is of less width and it preferably terminates about midway between the rear edge of the plate 21 and the brackets 15 (see Fig. 12). The front edge of this plate is curved to correspond to the curve of the plate 21 and the rear edge of said plate 21 is secured to the forward edge of the plate 103 preferably by suitable screws which pass upwardly through holes 103' in the plate 103 into the plate 21.

Secured upon the plate 103 are suitable standards 9' in which the grooved wheels 9 are mounted. The rear cross rod 5 passes between the parts of the standards 9' with the grooved wheels 9 resting thereon. Small wheels 9" are mounted in the standard 9' and bear against the under surface of the cross bar 5 so as to prevent any upward movement of the carriage. (See Fig. 14).

The two series of type bars are secured to the upper and lower surfaces of the plate 21 as hereinafter described. The plate 12 is preferably provided with a series of openings 24 and a recessed, substantially semi-circular, plate 25, with the ends of the recess closed, is arranged on top of the plate 12 over the openings 24, and forms a vacuum chamber, which I designate by the reference letter G, and to which all of said openings 24 are connected. An air pipe 26 is secured to said plate 25 and communicates with the vacuum chamber G. I also prefer to provide a substantially semi-circular sheet metal plate 27, having a depending inner edge which rests upon the upper surface of the plate 13, the outer portion of said plate 27 resting upon the recessed plate 25. (See Fig. 4). This plate is provided merely for covering the parts of the mechanism between the plates 13 and 12, and it may be omitted if desired.

Secured upon the plate 12 are the two brackets 28, 28, which are provided with studs 29 carrying the arms 30 (see dotted lines in Fig. 3), which extend inwardly and are secured to the standards 9', and thus form a support for the rear portion of the plate 12 and the parts carried thereby.

The type bars.

The type bars 34 carrying the type 32 are preferably arranged in two semi-circular rows and are so located that all of the type strike at the same printing point. The bars 34 are preferably made double and they are pivoted at their lower ends by pivots 35 between the arms of a yoke 36 (see Fig. 9ª). The yokes 36 for the inner series of type bars preferably rest against the under surface of the plate 21, and the yokes for the upper series of type bars rest upon the upper surface of the raised rim 23 on said plate 21. A thin strip of metal 37 preferably extends across each series of yokes 36 and screws 38 extend through these strips 37 and through the yokes and securely hold the yokes and type bars in position on the plate 21. Each of the type bars 34 is provided with a curved rearwardly extending arm 39. This arm is also double and between the two parts of the arm an operating link 40 is pivoted. The upper end of each of the links 40 extends through one of the slots 14 in the plate 13. These slots are of sufficient length to allow the upper ends of the links to have considerable forward and backward movement, without any material amount of lateral movement. The links for the inner and lower type bars are preferably straight as shown in Figs. 8 and 9 of the drawings while the links for the upper and outer series of type bars have their lower portions bent outwardly to bring them into proper position to connect with the curved arms on the operating bars. Pivoted to each of the links 40 is an arm 41 having its rear end pivoted to a bracket 42 secured by a screw 43 or other suitable means to the inner edge of the plate 12. The brackets 42 are preferably made of sufficient width to provide a pivotal support for three of said arms 41. Said arms 41 have the lugs 44 to which springs 45 are connected, the opposite ends of said springs being connected to the rear edge of the plate 13 (see Fig. 3).

As before stated the type bars are preferably arranged in groups of three, and I preferably provide twenty-six of such groups of type bars in a machine. The center bar of each group is preferably provided with small or lower case letter types, and one of the outer series is preferably provided with large or capital letter types. The other outer series of type bars is preferably provided with numeral types running from one to zero, and with characters of various kinds which may be desirable for use, such as punctuation marks, the % sign, the $ sign, etc.

The inner edge of the plate 13 is preferably provided with an inclined pad 46 against which the ends of the type bars strike when they are returned to their elevated position after each operation. The elevating or lifting movement, it will be seen, is performed by the springs 45 and these springs hold the type bars in the ele-

*Pneumatic motors for operating type bars.*

For operating any one of the type bars of each group of three such bars I provide an individual pneumatic motor, which as a whole I designate by the reference letter E. There are as many of these motors as there are groups of type bars and each motor is put in operation by means of one of the keys of the keyboard.

Each motor E consists mainly of a block 47 preferably formed of wood and of substantially rectangular form but with an inclined lower face 48. These blocks are secured in radial position on the under side of the plate 12 by means of suitable screws 49. Vertical holes 50 in the blocks register with the openings 24 in the plate 12 and thereby connect with the vacuum chamber G. From the lower ends of the openings 50 horizontal openings extend toward the end of the block and these openings are widened out into a chamber 51 that communicates with an opening 52 extending through the end of the block. The chamber 51 also communicates with a valve chamber 53 above which is an opening 54 leading through the top of the block and a port hole 55 leads from the valve chamber to the lower inclined surface of said block. A diaphragm 56 is arranged in the chamber 51 and prevents the passage of air from one portion of the chamber to the other except as the same may pass through a small opening 57 which is designated a "bleeding" hole. A valve 58 is arranged in the valve chamber 53 and is adapted to close the opening 54. The stem of this valve passes through an opening below said valve chamber and is connected with a plate 58' in the chamber 51 that is secured to the flexible diaphragm 56.

To the rear or thick end of the block 47 is hinged a plate 59 and the edges of this plate are connected to the walls of the block by a flexible sheet 60. A chamber 61 is thus provided between the plate 59 and the lower surface of the block 47. When air is admitted to this chamber its walls are expanded and the plate 59 is forced downward into the substantially horizontal position shown in Fig. 8. When air is exhausted from this chamber the walls are collapsed and the plate 48 is forced upward against the bottom of the block 47 by atmospheric pressure. It will be seen, therefore, that by alternately admitting and exhausting the air from the chamber 61, the plate 59 may be moved down and up and the movement of this plate may be utilized to perform the work of operating the type bars. I, therefore, designate this device a pneumatic motor. It has the advantage of being very quick and positive in its action.

A suitable vacuum pump F, hereinafter described, or other air exhausting means, is connected by a suitable tube with the pipe 26 that connects with the vacuum chamber G formed by the recessed plate 25. By this means a partial vacuum is created in the opening 50 and the chamber 51 within the block 47, and the valve 53 will be held in a closed position as represented in Fig. 8 of the drawings. There will then be, through the opening 54 the valve chamber 53 and the port 55, free admission of the outside air to the chamber 61, and this chamber will be kept in an expanded position with the parts substantially as shown in Fig. 6 of the drawing. A tube 62 connects the opening 52 with a valve chamber, hereinafter to be described, on the key-board of the machine. This chamber 63 is provided with a valve 64 held normally in a closed position, but capable of being opened by one of the keys on the key-board as hereinafter described. When the parts are in the position shown in Fig. 8 of the drawings a small quantity of air is drawn out of the pipe 62 through the "bleeding" hole 57. This creates a partial vacuum in the chamber 51 below the diaphragm 56 and the pressure of the outside air will cause the valve 53 to remain in the position shown in Fig. 8 of the drawings, leaving the opening 54 into the valve chamber uncovered, but closing the opening leading into the chamber 51. The parts will remain in the position shown in Fig. 8 of the drawings until one of the keys of the key-board is operated. Secured to the under surface of the plate 59 is an operating arm 65 whose forward end is upturned and engages one of the arms 41 whose forward end is pivotally connected to a link 40 of the type bar 34. Under normal conditions the operating arm 65 will engage the middle arm 41 of each group of type bars (see Fig. 10). The parts being in the position shown in Fig. 8 of the drawings, if one of the keys of the key-board is operated so as to raise the valve 64 from the position shown in Fig. 8 to that shown in Fig. 9, a small quantity of air will be allowed to rush into the tube 62. This air will enter the chamber 51 below the diaphragm 56. The pressure upon opposite sides of the diaphragm 56 will now be unequal and the valve 58 will move upward and close the opening 54, these parts now assuming the position represented in Fig. 9 of the drawing.

As the suction through the opening 50 continues the air in the chamber 61 will be drawn out through the opening 55. A vacuum will be created within the chamber 61 and atmospheric pressure will immediately collapse the walls of the chamber 61 and cause the bar 65 to move upward quickly thereby operating the type bar with the arm of which the bar 65 is engaged. As before stated, this will ordinarily be the arm connected to the middle type bar, and hence this bar will be depressed and brought into the position shown in Fig. 9 of the drawings and will strike a blow on top of the ribbon over the paper to be written upon.

The valve 64 will, for a reason hereinafter described, close very quickly after it has been opened. There will then be a tendency to equalize the pressure in the two parts of the chamber 51 on opposite sides of the diaphragm 56 through the "bleeding" hole 57, and as soon as this pressure is equalized the valve 58 will open or uncover the opening 54. Air will then pass into the chamber 61 through the opening 54 of the valve chamber, and the opening 55, and the walls of the chamber will be again expanded and the parts will assume their former position shown in Fig. 8 of the drawings.

It will be noted that I have shown twenty-eight of the individual pneumatic motors arranged around the curved outer surface of the frame of the type carriage and that these motors are located beneath the plate 12. Twenty-six of the motors are used for operating the type bars. The other two motors are used for other purposes as hereinafter set forth. The motors used for such other purposes are those located at the forward edge of the plate 12, one at either side of the machine. The motors for operating the type bars are those connected with the openings 24 extending through the plate and communicating with the chamber G as hereinbefore stated.

To secure the expansion of each of the chambers 61 I prefer to provide, upon each side of each individual pneumatic motor a spring 66', having one end secured to the wall of the block 47 and the other end secured to the edge of the plate 59 (see Fig. 4). When the plate is moved upward the spring is put under tension and when air is admitted to the chamber the spring aids in moving the plate 59 downward.

*The type shift.*

Arranged beneath the operating bars 65 is a semicircular shift bar 66 preferably standing edgewise and having its ends secured to a pair of spokes 67 radiating from a hub 68 that is mounted on a pivot pin 69 secured in a block 70 on the front of the transverse bar 11. The hub 68 turns freely upon the pin 69. A series of pins 71 project from the upper edge of the shift bar 66. These pins are arranged in pairs and each of the operating bars 65 extends between a pair of the pins. As before stated the rear end of each of the bars 65 is pivoted to the plate 59 and said operating bar passes through a guide loop 72 on the front end of the plate 59. By giving the hub 68 a slight turning movement on the pin 69 the operating bars 65 may be moved from their position beneath the middle type bar operating arm as shown in Fig. 10 to a position beneath either of the other operating arms of the same group. When the operating bar 65 is moved beneath the arm that connects with an "upper case" or capital type bar an "upper case" capital letter will be printed upon the paper. If said operating bars are moved in the other direction a numeral or a special type character will be printed upon the paper. Ordinarily the operating bar 65 will be held beneath the center arm of each group, and in this case the small or "lower case" letters will be printed.

To move the shift bar 66 in either direction I provide a lever 73 pivotally supported upon a lug 74 on the plate 21. The upper end of this lever has a fork 76 that engages a pin 75 on the shift bar 66, and the lower end is provided with a grooved roller 76'. I also provide two levers 77 and 78 pivoted at 79 upon a stationary support which is also provided with the projecting arms 80 extending above and below said levers. Springs 81 are connected to these arms and also to said levers and tend to hold them normally in a substantially horizontal position as shown in Fig. 5 of the drawings. For operating the levers 77 and 78 I provide a double pneumatic motor or two motors arranged one on top of the other, but adapted to operate in opposite directions. As here shown two motors 82 are provided, both connected to a duct 82' that extends upward through an opening in one of the brackets 15 and connects with the vacuum chamber G within the recessed plate 25. The movable plates of these motors are the same in structure and mode of operation as the movable plate 59 in the individual pneumatic motor for operating the type bar already described, and I have, therefore, applied the same reference number, 59, to these plates. (See Fig. 6). The lower plate 59 is provided with a projecting arm 83 that is connected by a link 84 to the end of the lower lever 77 and the upper plate 59 is provided with a projecting arm 85 connected by a link 86 to the end of the upper lever 78.

The lever 77 has an inclined recess 87 at the upper end of which is a vertical lug 88, and the lever 78 has an oppositely extending inclined recess 89 at the bottom of which is a vertical lug 90. Said lugs are in engagement with roller 76' on the arm 73. The motor 82 is connected by tubes 91 and 92 to valve chambers at the keyboard one of which is controlled by the key marked "Capitals," shown in Fig. 29, and the other of which is controlled by the key marked "Figures" on the same keyboard. When the key marked "Capitals" is depressed one unit of the double motor will be operated and one of the levers 77 or 78 will be moved and thereby, through the lever 73, the shift bar will be turned so as to bring the operating bar 65 into position to print an upper case letter. When the other key marked "Numerals" is operated the shift bar will be moved in the other direction, so as to bring the operating bar into position to cause a numeral or one of the special characters to be printed. Under normal conditions the levers 77 and 78 will be in the position shown in Fig. 5 of the drawings, the roller 76' on the lower end of the lever 73 will stand between the vertical lugs 88 and 90, and the shift bar will be in position to hold the operating bar 65 under the center arm of the group. So long as the parts remain in this position the machine will print small or lower case letters.

The double motor 82 is provided with springs 66' for insuring reverse movement of the plate 59 corresponding to the springs on the single motor E hereinbefore described.

*The ribbon support and feed.*

The inking ribbon 93 is supported upon spools 94 and passes forward from one of these spools through a ribbon guide 95, by which it is given a right angle turn, then passes across the carriage through another guide 95 and back to the other spool 94. The ribbon also passes through two loops 96 on a forked ribbon holder 97 pivotally supported upon a pivoted standard 98. The standard 98 is pivoted upon a bracket 99 secured to the under side of the center of the curved plate 21 by a suitable screw 100. In the rear of the plate 21 a short transverse shaft 101 is mounted in suitable bearings 102 that are secured to the plate 103 that extends across the type carriage in the rear of said plate 21 and substantially on a level therewith. At its inner end the shaft 101 is provided with two crank arms, an upwardly extending long arm 104 and a downwardly extending short arm 105. The rear end of the ribbon holder 97 is pivotally connected to the end of the crank arm 104. The opposite end of the shaft 101 is provided with another crank arm 106. A connecting rod 107 has its rear end connected to the crank arm 106, and its forward end is connected to one arm of a bell crank lever 108. This lever is pivotally supported upon a standard 109 that is in turn supported upon the plate 21. At the right hand side of the machine, as here shown, is an individual pneumatic motor 110 similar to the motors E hereinbefore described. The movable plate of the motor 110 is connected by a rod 111 with the bell crank 108. The arrangement at the keyboard, hereinafter described, is such, that every time a letter key is operated power is applied by means of a universal bar to the motor 110, and this through the parts already described causes the ribbon carrier to be brought forward and downward about three quarters of an inch. In its motion the ribbon does not quite touch the paper. This movement is so timed that the ribbon is brought into proper position over the paper before the type reaches it.

I also provide mechanism to wind the ribbon off from one spool and onto the other and to feed it along a certain distance after each letter is printed.

Arranged below the plate 103 is a bracket 112 upon which is pivoted a bar 113. This bar is provided with a series of forwardly projecting lugs 114 in which a small shaft 115 is journaled. This shaft is provided near its center with a ratchet wheel 116 and at each end with a small pinion 117. A pawl 118 is connected to the crank arm 105 and as the shaft 101 is rocked the shaft 115 is rotated. The pivotal support for the bar 113 carrying the shaft 115 permits either one of the pinions 117 to be brought into engagement with the gear 119 on one of the ribbon spools. Small portions of these gears are shown in sections in Fig. 13. It will be noted that either of the pinions 117 may be brought into engagement with the corresponding gear 119 without interfering with the operation of the ratchet wheel 116 by the pawl 118. Any suitable means may be provided for changing the position of the bar 113 and the shaft 115 carried thereby. I have here shown a projecting arm 120 having an inclined slot through which passes a pin 121. The arm may be adjusted by hand to bring the desired pinion into engagement with the corresponding gear upon the ribbon spool. If desired the parts may be moved into a neutral position in which neither pinion is in engagement with the spool gears. This it will be found convenient to do when it is desired to put a new ribbon into the machine.

I prefer to provide means by which the bar 113 may be locked with either of the pinions 117 in engagement with the corresponding spool gear 119, or with both of said pinions out of engagement with said gears. For this purpose I provide a pin 113' on the bar 113 which projects upwardly through a slot 113" in the plate 103. A dog 120' provided with a spring 120" is mounted on top of the plate 103. It is provided with a notched end that is arranged to engage and lock the pin 113' in any one of the three positions to which it may be moved by the swinging of the bar 113, thereby holding the pinions in neutral position, or locking either pinion in engagement with the corresponding spool gear 119.

*The letter spacing mechanism.*

Mechanism is provided by means of which the type carriage, after each letter or character has been printed, is moved one space to the right to bring the printing point of the machine into position for printing the next letter or character upon the book or sheet. For this purpose the type carriage has secured to its rear portion a transverse rack bar 122, the teeth on said rack bar being at its lower edge. This rack bar may be secured to the type carriage by any suitable means. In Fig. 12 I have shown it secured to a stationary part of the carriage by means of suitable screws. Mounted in bearings upon the main carriage B of the machine is a shaft 123 extending transversely of the machine and carrying at its inner end a bevel gear 124. The shaft 123 is driven preferably from a suitable electric motor 125, which is belted to a pulley 126 on a shaft 127 arranged in stationary bearings, preferably mounted upon suitable standards below the machine table. Yokes 128 and 129 connect the shaft 127 and the shaft 123. A belt 130 extends from the pulley on the shaft 127 to a pulley 131 located at the pivotal point of the yokes, and the belt 132 extends from the pulley 131 to a pulley 133 mounted loosely on the shaft 123. This arrangement of yokes and belts permits a positive connection between the shaft 127 and the pulley 133 independently of the position of the main carriage B on the table. The pulley 133 is arranged on the shaft 123 between a stationary disk 134 and a sliding disk 135. The disk 134 has a sleeve 136 that is fast to the shaft 123 and the disk 135 is supported upon said sleeve 136. The end of the sleeve 136 is screw-threaded and a cap-nut 137 is screwed onto the end of said sleeve. A suitable spring 138 is arranged within the cap-nut 137 and bears against the face of the disk 135. When the load upon the shaft is less than the friction between the pulley 133 and the disks between which it is held said shaft will be rotated with said pulley. When the friction between these parts is insufficient to overcome the load on the shaft the pulley will rotate between the disks and the shaft will remain stationary.

The main carriage B is provided with a hollow transverse supporting bar 139. The ends of this bar are secured to the side bars 4 and said bar extends beneath the type carriage and in close proximity to the rack bar 122. Upon the top of this bar a horizontal plate 140 is secured. Secured to said plate 140 at the rear and front edges thereof are the upright plates 141 and 142. One or both of these upright plates may, if preferred, be formed integrally with the horizontal plate 140. Said plate 140 is provided with a bearing 143 for the inner end of the shaft 123, the beveled pinion 124 on said shaft 123 being inside of said bearing. (See Figs. 15 and 18.) A transverse shaft 144 is mounted in bearings in the upright plates 141, 142. The shaft 144 has mounted loosely thereon bevel gears 145 and 146 that mesh with the bevel gear 124 on the shaft 123. The bevel gears 145 and 146 are preferably formed integrally with sleeves 147 and 148 and these sleeves are provided at their inner ends with ratchets 149 and 150. The sleeves, the ratchets and the gears are all loose upon the shaft 144. A sleeve 151 having ratchets at its ends is splined upon the shaft 144 between the ratchets 149 and 150. This sleeve is arranged to slide upon said shaft 144 but must turn therewith. The sleeve is provided with a central rib 152 engaged by a forked arm 153 mounted upon a pivoted post 154. One end of the shaft 144 is provided outside of the upright plate 141 with an escapement wheel 155. This wheel is secured to the shaft preferably by being pinned thereto. The other end of the shaft 144 is provided inside of the upright plate 142 with a pinion 156 also made fast thereon preferably by being pinned thereto. The pinion 156 is at all times in engagement with the rack bar 122 on the type carriage.

A shaft 157 is journaled in bearings in the upright plates 141, 142, and extends parallel to the shaft 144. At its forward end this shaft is provided with a pinion 158 mounted loosely thereon and provided at its edge with a ratchet 159. A sleeve 160 is fast upon the shaft 157 and a sliding clutch 161 is arranged between this sleeve and the pinion 158, the edge of the clutch being provided with a series of ratchet teeth arranged to engage the corresponding teeth upon the edge of the pinion 158. A projection on the sleeve 160 engages the clutch 161 so that said clutch must at all times turn with said sleeve. A spring 162 engages a rib on the sleeve and the rib on the clutch, and tends at all times to hold the clutch ratchet in engagement with the ratchet on the pinion. A bell crank lever 163 has one arm engaging the clutch and its other arm is engaged by a roller 164 provided on an arm 165 secured to the post 154. The shaft 157 is also provided with an escapement wheel 166 and with a ratchet wheel 167 engaged by a pawl 168, this ratchet wheel and pawl preventing backward movement of the shaft. A bracket 169 projects beyond the horizontal plate 140 and a post 170 is mounted in this bracket. Secured to this post is a sleeve 171 having an escapement arm 172 that projects toward the ratchet wheel 166. This arm is of sufficient length to have its end engaged by the teeth of the escapement wheel when said arm stands directly in line with said wheel as shown in Figs. 21 and 23 of the drawings. As shown in Fig. 23ª the arm 172 has a shorter section 173, which is of such length that when it is in line with the ratchet wheel the teeth of the wheel will not be engaged by the end of the section. This relation is illustrated in Fig. 18 of the drawings, where the section 173 of the arm is shown extending toward but not reaching the ends of the teeth of the escapement wheel. A groove 173' is formed in the upper surface of the section 173 of the arm 172 and a dog 174 is arranged in this groove and is pivoted to the arm by the pivot pin 175. The end of the dog extends beyond the pivot and is engaged by a spring 176 which tends to pull down on the rear end of the dog and to raise the forward end above the arm 172 into the position indicated by dotted lines in Fig. 18. The post 170 is provided with a bell crank lever 177, a spring 178 engages the short arm of this lever and tends to hold the parts in the position indicated in Fig. 15 of the drawings, with the long portion of the escapement arm disengaged from the teeth of the escapement wheel and with the end of the dog 174 in engagement with one of said teeth as illustrated in Figs. 15, 18 and 19. A block 179 is arranged upon the plate 140 and its upper end is provided with a recess through which the arm 172 projects, the walls of this recess forming stops to limit the lateral movement of said arm in both directions. A pneumatic motor 180, similar to the individual pneumatic motors already described, is provided with its movable plate 59 arranged to swing in a horizontal plane (see Figs. 17 and 23). A rod 181 is secured to the plate 59 and a link 182 connects the end of this rod with the long arm of the bell crank 177.

The operation of this escapement is clearly illustrated in Figs. 19, 20 and 21 of the drawings. Let it be assumed that the parts are in the normal position shown in Figs. 15, 17 and 19, with a tooth of the escapement wheel in engagement with the end of the dog 174. The dog will be depressed into the recess 173' in the arm 172, as shown in Fig. 19 of the drawings. The escapement wheel and the shaft upon which it is mounted will be prevented from turning, the train of mechanism leading back to the shaft 123 will be held against movement, and the pulley 133 will turn between the disks 134 and 135. The shaft 123 and the parts between said shaft and the escapement wheel will remain stationary. Upon the operation of any letter key at the key-board, the motor 180 will, through the universal bar hereinafter to be described, be operated and the escapement arm 172 will be swung sidewise carrying the parts from the position shown in Fig. 19, to the position shown in Fig. 21. When the parts reach the position shown in Fig. 21 the tooth of the escapement wheel that had previously been engaged by the end of the dog 174 will now be engaged by the end of the arm 172. As soon as the dog 174 is freed from the escapement tooth its forward end will be moved up into the position shown by dotted lines in Fig. 18 and also shown by full lines in Figs. 20 and 21. Immediately after this movement takes place the motor arm 181 will return to its original position and the arm 172 will move back to its original position, releasing the tooth of the escapement wheel that is in engagement with it and bringing the end of the dog 174 into engagement with the next succeeding tooth of said escapement wheel. These parts will pass from the position shown in Fig. 21, through the position shown in Fig. 20, back to the original position shown in Fig. 19, the pressure exerted by the tooth of the escapement wheel on said dog 174 forcing said dog downward into the recess 173' of the arm 172 and bringing the parts back into their normal position shown in Figs. 15, 17 and 19. The tooth of the escapement wheel, held by the arm 172 in Fig. 21, will, when said arm is returned, pass by the end of the short section 173 of said arm, while the following tooth will engage the dog 174 and force it into the recess 173' and will thereby hold said escapement wheel until the next operation. At each operation, therefore, the escapement wheel will be permitted to turn a distance equal to the space between two of its teeth. This will permit a corresponding movement of the train of mechanism between said escapement wheel and the friction pulley 133. As this mechanism includes the pinion 156 that is in engagement with the rack bar 122 on the type carriage said rack bar and type carriage will be moved to the right a distance equal to one letter space. This operation will take place as often as a letter or other character is printed upon the paper or book.

*Mechanism for returning the carriage.*

When the type carriage reaches the end of the line it is necessary to move it to the left or return it to its original position for the purpose of beginning another line, and I prefer to accomplish this by power mechanism under the control of a special key on the keyboard. I provide, preferably secured to the transverse bar 139, an individual motor 183, which is controlled by the "return key" on the board hereinafter described. This motor is similar to the motors for operating the type bars hereinbefore described. The movable plate 59 of this motor has a rod 184 connected to it, and this rod is connected by a link 185 with an arm 186 secured to the post 154. A spring 185' is connected to the arm 186 (see Figs. 15, 16, 17 and 18). Upon pressing the "return key" on the keyboard the motor 183 is caused to operate, and, through the rod 184, the link 185, and the arm 186, the post 154 is turned, causing the sleeve 151 to be moved so as to disengage the ratchet 150 on the sleeve 148 and to engage the ratchet 149 on the sleeve 147. This will cause the shaft 144 and the pinion 156 to turn with the gear 145 and in the reverse direction from that at which it is turned through the gear 146. At the same time, through the arm 165, the bell crank lever 163 will be caused to move the clutch 161 out of engagement with the pinion 158. The rack bar 122, together with the type carriage, will now be given a reverse or return movement and it may be moved to the extreme position that it may occupy to the left of the main carriage or it may be stopped at any intermediate point. This movement will continue so long as the "return key" is depressed, or until the carriage reaches the limit of its travel. The spring 185' tends to hold the sleeve 151 normally in engagement with the ratchet 150, and the parts will return to this position when the "return key" is depressed.

As the pinion 158 is loose upon the shaft 157 it is not absolutely necessary to disengage the clutch 161 from this pinion during the reverse movement of the carriage, but as if it were not reversed the turning of the pinion on the clutch would make some noise I prefer to disengage the clutch from the pinion so as to permit the pinion to turn freely during the reverse movement of the carriage.

The back spacing mechanism.

It is frequently desirable to move the type carriage backward a single space for the purpose of making corrections in the work, and I preferably provide means, working in conjunction with the mechanism for returning the carriage, for moving the carriage back a single space only. I provide upon the keyboard a special key for producing this result. This key is marked "Back Spacer". In the first part of its operation it brings into action an individual pneumatic motor marked 187 in the drawings. During the latter part of the movement of the "back spacer" key it engages and depresses the "return key" and this, as before described, brings into operation the individual pneumatic motor 183. The construction and arrangement of the "back spacer" and "return key" are hereinafter described in connection with the general description of the key-board. For present purposes it is only necessary to state that in back spacing the motor 187 first operates, and immediately thereafter the motor 183 operates. The action of these two motors causes the type carriage to be moved backward, or to the left, a distance equal to substantially one and one-half letter spaces. The same mechanism then causes the carriage to move forward a half space. The net result is, therefore, a reverse movement of one letter space.

I have already referred to the escapement wheel 155 on the shaft 144. This wheel has the same number of teeth as there are ratchet teeth on the pinion 158. A dog 188 having a slot 189 is secured by a screw 190 upon the face of the vertical plate 141. The rear end of the dog is provided with a pin 192. Its forward end rests upon a pin 193, and a pin 194 projects from the face of the plate 141 a short distance above the forward end of the dog (see Figs. 16 and 22). A bell crank lever 195 is pivoted in a suitable support upon the plate 141, preferably upon its upper edge, and one arm of this lever is provided with a fork which engages the pin 192 on the dog 188. A spring 196 has one end connected to the dog 188 and the other to the plate 141 below, and in the rear of said dog. A spring 197 has one end connected to the downwardly extending arm of the bell crank lever 195, and the other end is connected to a pin on the face of the plate 141. The movable plate 59 of the motor 187 has an arm 198 extending over the end of the substantially horizontal arm of the bell crank lever 195. The normal arrangement of the parts, when not in action, is shown in Fig. 16. When the back space key on the key-board is depressed the motor 187 is brought into action, the plate 59 and the arm 198 are depressed, and the dog 188 is thrown forward into the position shown by full lines in Fig. 22 with its end engaging one of the teeth of the escapement wheel 155. Immediately thereafter the motor 183 is brought into operation which causes the carriage to be moved in a reverse direction, or from right to left. As the carriage moves the escapement wheel 155 is turned, carrying the end of the dog 188 with it, until said dog strikes the pin 194. This position of the dog is shown by dotted lines in Fig. 22. This stops the reverse movement of the carriage after it has been moved toward the left a distance equal to a letter space and a half. The pinion 158 will be given a like amount of movement as it is directly engaged by the rack bar 122 on the type carriage. The ratchet teeth on the clutch 161 will now stand midway between the teeth on the pinion 158. At this point the motor 183 will reverse and the sleeve on the shaft 144 between the bevel gears 145 and 146 will be returned to its normal position with its ratchet teeth in engagement with the ratchet teeth on the sleeve 148, and the points of the teeth on the clutch 161 will be projected substantially into the centers of the spaces between the teeth of the pinion 158. This provides a slight amount of lost motion between the ratchet teeth on the clutch 161 and the corresponding teeth on the pinion 158, which is immediately taken up by a slight forward movement of the carriage equal substantially to one-half of a letter space. At the same time the escapement wheel 155 will be given a slight reverse movement and a reverse movement of the motor 187 will take place, permitting the springs 196 and 197 to return the dog 188 and the bell crank 195 to their normal position.

I have found in the operation of the machine that it is desirable in back spacing to move the carriage backward a little more than a full space, or practically a space and a half as hereinbefore described, and then to take up the lost motion by moving it forward the distance that the return movement exceeds a full space. If this is not done, but the carriage is moved backward a single space only, it is difficult to cause the teeth on the clutch 161 to properly engage the desired teeth on the pinion 158. By the arrangement described, however, I am enabled to insure the proper reëngagement of these clutch members, and to positively and reliably secure a single space back movement of the type carriage.

Limiting stop for type carriage.

I prefer to provide an adjustable stop to liably secure a single space back movement I have shown a rack bar 264 secured to the front cross-rod 5, by suitable blocks 265. A stop block 266 is arranged upon this bar and may be changed at any point thereon by a set-screw 267. The block 266 comes in the path of movement of the projection 19 and thus the movement of the type carriage to the left is limited by the position of this block.

The line spacing mechanism.

The line spacing is provided by feeding forward, or toward the front of the machine, the main carriage B, upon which the type carriage C is supported. As before stated, the main carriage is provided near its end with a transverse shaft 6, having at its ends gear wheels 7 which engage the rack bars on the table or frame of the machine. To feed the main carriage forward for line spacing, the shaft 6 is given a partial rotation. The mechanism by which this operation is performed is shown principally in Figs. 24, 25, 26, 26ª, 26ᵇ, and 27 of the drawings. A sleeve 199 is mounted on the shaft 6 preferably at the left-hand end thereof, and this sleeve extends preferably about half way across the carriage and is held in place by a collar 200 preferably pinned to the shaft 6. The sleeve is provided with a crank arm 201 and this is connected by a connecting rod 202 with a crank arm 203 on a short shaft 204 supported upon the transverse bar 139 by a bracket 205. This shaft is also provided with a crank arm 206. An individual pneumatic motor 207 is preferably supported upon the transverse bar 139 and the rod 210 of this motor is connected by a link 211 with the crank arm 206.

The shaft 6 supports at its end the gear 7 and also a disk 212, this disk and the gear 7 being preferably pinned together and the hub of the disk being splined upon the shaft 6. The gear 7, the disk 212 and the shaft 6 must therefore rotate together. A hub 213 is mounted loosely upon the sleeve 199 close to the face of the disk 212 and this hub has secured to or formed integrally with it an irregularly shaped plate 214. The outline of the plate 214 is shown by the horizontally shaded lines in Figs. 25 and 26 of the drawings. The plate 214 is provided with a projection 215 adapted to bear, when in normal position, against the upper surface of a block 216 secured to one side of the rail 4. The outline of this block is shown clearly in Fig. 26ª of the drawings. A spring 217 mounted on an arm 219, engages a pin 218 in the plate 214. Said arm 219 is rigidly secured to the sleeve 199. Pivoted upon the upper end of the plate 214 is a dog 220. This dog is adapted to be thrown forward when desired, into engagement with the serrated edge of the disk 212 (see Fig. 26). When the dog is released the spring 221 with which it is provided lifts the end of the dog which is also preferably serrated from the edge of the disk 212 (see Fig 25). The operating arm 219 extends above and below the shaft 6 and sleeve 199, and the lower end of this arm is engaged by a spring 222, the opposite end of which is connected to the transverse bar 139 (see Fig. 25). A locking dog 223 is pivoted near the serrated edge of the disk 212 and this dog is provided with an arm 224 that extends between a stationary pin 225 and a spring 226. The plate 214 is also preferably provided with a series of stop lugs 227. An adjustable stop bar 228 having a spring locking pin 229 is provided in the block 216. This bar may be moved inward into position where it will be engaged by the first lug 227 on the plate 214, or it may be drawn out so that it will be engaged by the second lug, or still further so that it will only be engaged by the last of said lugs 227.

When it is desired to move the carriage forward one space for line spacing the "line spacer" key is depressed. This puts the motor 207 into operation and said motor through the rod 210 and the parts connected therewith rocks the sleeve 199 in its bearings. When the rocking motion begins the parts will be in the position shown in Fig. 25 of the drawings, the dog 220 being away from the edge of the serrated disk. When the lower end of the arm 219 moves away from the lower end of the dog 223 the spring 226 moves the serrated edge of this dog away from the serrated edge of the disk 212, bringing the end of the lug 224 on said dog against the pin 225 and moving the end of the dog away from the edge of the disk. As the arm 219 moves from the position shown in Fig. 25 to the position shown in Fig. 26, its upper end comes in contact with the pin 221' on the upper end of the dog 220. This rocks the dog forward until its serrated end engages the serrated edge of the disk. A further movement of the arm 219, through the dog 220 and the serrated disk 212, turns the shaft 6 and the gears 7, and, by their engagement with the rack bars 8, causes the main carriage B to move toward the front of the machine a sufficient distance to bring the type carriage into position for printing a new line. The distance that the shaft 6 can be rocked is determined by the position of the stop bar 228. If this bar is in the position shown in Fig. 25 of the drawings its end will be encountered by the first lug or projection 227 on the plate 214. If this bar is in position to be engaged by the second lug or projection a greater movement of the main carriage will be permitted. If it is in position to be engaged by the third lug or projection a still greater movement will be given to said carriage.

By adjusting the stop bar 228, therefore, I am enabled to provide three different widths of line spacing.

As soon as the main carriage has been moved the desired distance to provide the requisite line spacing the motor 207 is reversed and the arm 219 is swung back into the position illustrated in Fig. 25 of the drawings. Its lower end then engages the lower end of the dog 224 and throws the upper or serrated end against the serrated edge of the disk 212 and locks said disk and the gears 7 against further movement and thereby locks the main carriage in a stationary position upon the table.

*Mechanism for disconnecting the carriage feeding devices.*

It is frequently desirable to disconnect both carriages from the feeding devices hereinbefore described so as to permit said carriages to be moved freely by hand. When these devices are disconnected the operator, grasping a portion of the frame of the type carriage, can move both carriages forward and back or he can move the type carriage to the right or left on the main carriage. He can thus very quickly bring the printing point of the type carriage to any desired position. I preferably provide means whereby, when the operator grasps the frame of the type carriage, he can at the same time disconnect the feeding devices from both carriages. This mechanism as here shown is arranged as follows:

Upon the frame of the type carriage and preferably located upon the right hand bracket 15, is a push button 230 having a stem 231 that passes through an opening in a valve block 232. This stem is surrounded by a spiral spring 233. The block 232 is provided with openings 234 and 235, which are closed by valve plates 236 and 237. Springs 238 and 239 tend to hold these plates over the openings in the valve block completely closing the same. The plates 236 and 237 are provided with extensions which overlap each other and stand in front of the valve stem 233 (see Figs. 4 and 7).

A tube 240 connects the opening 234 with the return motor 183, and a tube 241 connects the opening 235 with a similar motor 242 preferably arranged upon and secured to the transverse bar 139 on the main carriage. The movable plate 59 of the motor 242 is provided at one end with an arm 243 and at its other end with an arm 244. The arm 243 is connected by a link 245, with a lever 246 pivoted at 247 on the bar 139, and having a short arm extending inwardly below the arm 186. The arm 186 is provided with a downwardly projecting pin 248. Normally the lever 246 stands in the position indicated by dotted lines in Fig. 15, and the end of the short arm of the lever is out of the path of movement of the pin 248, when the arm 186 is moved by the return motor 183. The other rod 244 on the motor 242 has a slotted link 249, connecting with an arm 250 that projects from the shaft 204 (see Fig. 24). When the shaft 204 is rocked by the motor 207, in line spacing, there is no movement of the link 249, as the pin connecting this link with the arm 250 moves freely in the slot. When, however, the motor 242 operates, the shaft 204 is rocked slightly and this movement rocks the sleeve 199. This movement is just sufficient to bring the dog 223 out of engagement with the edge of the serrated disk 212 without bringing the dog 220 into engagement with said disk. As this disk is thus disengaged by both dogs, the shaft 6 and gear 7 are free to turn in both directions, and the main carriage B may, therefore, be moved freely forward and back on the rails 3. When the operator presses in on the push button 230 and uncovers the opening 234, air is admitted to the motor 242 and the movement of the plate 59 of said motor simultaneously moves the lever 240 into the position shown by full lines of Fig. 17 of the drawings, and releases the serrated disk 212 on the shaft 6 of the main carriage.

A further inward movement of the stem of the push button uncovers the opening 235 and permits the operation of the return motor 183. This motor now, through the rod 184, the link 185 and the arm 186, post 154, and arm 153, moves the sleeve 151 out of engagement with the sleeve 148, and the pin 248 on the arm 186 coming in contact with the end of the short arm of the lever 246 limits the movement of the arm 186, causing the sleeve 151 to be stopped in a neutral position midway between the two ratchets on the sleeves carrying the bevel gears 145 and 146. At the same time the clutch 161 through the arm 165 and the bell crank lever 163 is moved out of engagement with the teeth of the pinion 158. The pinions 156 and 158 engaged by the rack bar 122 on the type carriage, are now free to turn in either direction on their supporting shafts, and, hence, the type carriage may be moved freely by hand in either direction transversely of the main carriage.

The push button 230 is so located that as the operator grasps the right-hand bracket 15 to move the type carriage he can conveniently press the push button with his thumb and so long as this push button is pressed inward the parts will remain disengaged in the manner above described and both carriages will be free to move in either direction as above set forth.

The location of the independent motors.

It will be understood from the foregoing description that twenty-eight of the individual pneumatic motors are located around the outer edge of the semi-circular plate 12. Twenty-six of these motors operate the type bars. These motors are designated by the reference letter E. A double motor 82, also supported beneath the edge of the plate 12, operates the type shift. This motor as hereinbefore explained is located at the forward left-hand corner of the plate 12. A motor 110 located beneath the edge of the plate 12 at the forward right-hand corner of said plate operates the device for controlling and feeding the inking ribbon.

There are also five independent motors which are employed in the other operations of the machine and which have been heretofore described. These motors are marked with the reference numerals 180, 183, 187, 207, and 242. These motors are all supported upon and carried by the transverse bar 139. Each of these motors, except the motor 187, has its exhaust opening connected by a tube 250' to a vacuum chamber H, within the bar 139, this bar being made hollow for the purpose of providing such vacuum chamber at a convenient location (see Figs. 2ª and 15). The motor 187 is located on top of the motor 180, and it is connected to the discharge opening in the motor 180 by the tube 252. The motors 180, 183, 207 and 242 are located upon the same level and are each attached directly to the hollow bar 139 in which the vacuum chamber H is located.

The arrangement of the vacuum tubes.

It will be understood that there are two main vacuum chambers. One is the chamber G within the recessed plate 25 on the circular plate 12 of the type carriage, to which the twenty-eight individual pneumatic motors supported by the plate 12 are all connected. The other vacuum chamber H is within the transverse bar 139. The five independent motors, hereinbefore described, are all connected to this chamber. As I have stated, I provide a suitable vacuum pump F, or other means, for exhausting air from the chambers G and H.

A tube 26 extends from the vacuum pump F upward and preferably along the frame of the machine to the front thereof. It is then united with the other tubes 62 from the key-board, and, hanging loosely under the table, it is carried up to the type carriage and connected to the vacuum chamber G within the recessed plate 25. The portion of this tube that connects with said vacuum chamber is shown at the upper left-hand corner of Fig. 2 and it is there marked 253ª. A branch tube 254 leads off from the main tube 253 and connects with the vacuum chamber H within the transverse bar 139. As the main carriage B and the type carriage C move forward the tubes 26 and 254 (which are suspended freely under the table) move with said carriage, and the tube 26 also moves from side to side with the type carriage C, as said carriage is moved laterally in either direction upon the main carriage B.

The key-board.

Mounted on a suitable support on the front of the main table is a key-board, which, as a whole, I designate by the reference letter J. This key-board consists of a suitable frame 255, preferably mounted on suitable brackets 256 and secured in a permanent manner to the front of the table. This key-board is provided with a series of pivoted levers or keys each having an ordinary typewriter button, suitably designated, at its forward end. These keys are designated to open the valves 64 in the valve chamber 63, to which chambers are connected, the tubes 62 leading to the pneumatic motors. When the keys are in normal position the valves 64 are closed and the vacuum pump hereinbefore described causes the air to be partially exhausted from the tubes 62 which, as hereinbefore described, extend from the key-board to the pneumatic motors.

The letter keys.

The valve chambers 63 are shown clearly in Figs. 8, 9, and 30 to 36. The tubes 62 are connected to these valve chambers and are also connected to the openings 52 in the ends of the blocks 47 of the pneumatic motors E (see Figs. 8 and 9). I indicate the letter keys by the reference numeral 257. There are twenty-six of these keys, and, as hereinbefore explained, they are arranged to normally cause the printing of the twenty-six "lower case" letters of the alphabet. When the key marked "Capitals" is operated the type shift is moved in one direction, thereby causing the type bars carrying the capital letters to be operated. When the key marked "Figures" is operated the type shift is moved in the other direction, and the figures, punctuation marks and other characters indicated on the twenty-six letter keys are printed. The letter keys 257 are all pivotally supported upon a transverse rod 258 (see Figs. 8, 9, 34 and 35). The letter keys are preferably arranged with the buttons thereof in three rows, as shown in Fig. 29 of the drawings, and their forward ends terminate alternately over the valves 64, which are preferably arranged in two rows as shown in Figs. 29, 34 and 35. The valves 64 cover openings in the valve chamber 63 to which the tubes 62 are connected. Each of the valves 64 has a projecting lip and a hooked dog 259 is pivotally supported upon the end of the key-lever 257, and the dog is held in its normal position by a spring 260, which brings the shank of the dog against a pin 261. The dog is preferably provided above its pivot with a short horizontal arm, and a tripping plate 262 extends across the key-board above the ends of all of the key-levers 257. A spring 263 is connected to each of said levers and tends to hold its rearward end down, thereby permitting the valves 64 to remain closed as shown in Fig. 34 of the drawings. The dogs 259 preferably have their hooked ends standing at a short distance below the edges of the valves, so that there is a slight lost motion between the dog and the valve, thereby allowing for a slight movement of the key lever before the valve opens. The tripping plate 262 is preferably provided with a flange at each edge and when the horizontal arm on the dog 259 strikes this flange the lower end of the dog is thrown away from the valve and the valve is released (see Fig. 33). The valve automatically closes instantly and prevents further entrance of air to the valve chamber 63 and tube 62.

With this arrangement of the letter keys it will be understood that the individual motors operating the type bars are each given a single, quick impulse, which causes the type to strike sharp blows upon the ribbon and paper below the same, thereby making clear impressions on the paper.

The universal space bar.

As hereinbefore stated, I provide means whereby, when any letter key is operated, the inking ribbon is fed forward and is also moved into printing position, and simultaneously the escapement mechanism hereinbefore described, on the type carriage, is put into position so that upon its release after the printing of a letter or character, the type carriage is caused to move one letter space to the right. For this purpose one of the tubes 62 connected to one of the openings in the valve chamber 63, is branched (see Figs. 32 and 33). One branch leads to the motor 110, which, as hereinbefore explained, controls the operation of the ribbon feed and ribbon positioning device, and the other branch leads to the motor 180 which moves the escapement arm 172, the return of which permits the escapement wheel 166 to move one step, thereby permitting the type carriage to be moved one letter space to the right.

The universal bar 268 extends horizontally beneath the lever arms of all the letter keys, as shown in Fig. 29 of the drawings, but it does not extend under the "return" key, the "back spacer" key, or the "figures" key. It does extend under the "line spacer" key in the form in which I have shown the keys arranged, but in this instance the lever arm of said "line spacer" key is provided with a recess 269 in its under side, which comes above a notch or recess in the top of said universal bar 268, so that depressing the "line spacer" key does not bring it in contact with said universal bar (see Fig. 37). The universal bar 268 is provided with lever arms 270 mounted loosely upon a transverse shaft 271. The ends of these arms extend a short distance beyond the shaft 271, and a spring 272 is connected to each of said ends (see Figs. 30, 31, 32 and 33), and also to the frame of the key-board. These springs normally hold the universal bar at the upward limit of its movement, or in the position shown in Fig. 32 of the drawings. One of the arms 270 is provided with a forward extension 273 having a hook 274, engaging a valve 275 above one of the openings in the valve chamber 63 (see Figs. 32 and 33).

With this arrangement it will be seen that whenever a letter key is depressed the universal bar will be depressed also. The parts are so arranged that the ribbon actuating device is first operated; then the type is brought against the ribbon and paper printing the desired character thereon; and then the carriage is fed one space to the right. These operations are performed in the sequence named by the individual pneumatic motor 110, one of the pneumatic motors E, and the pneumatic motor 180.

It will be desirable at times to operate the spacing device without operating any of the letter keys. For this purpose I provide the separate space bar 276, which is secured to the arms 277 having their inner ends fast to the shaft 271. The shaft 271 is mounted in bearings in the frame of the key-board so as to be capable of rocking on its axis. An arm 278 is secured to the shaft 271 and extends downwardly therefrom. A spring 279 is connected to this arm and to the frame of the key-board. This spring tends to raise the outer ends of the arms 277 and the space bar 276. The upward movement of said parts is preferably limited by a stop lug 280 with which the ends of the bars 277 engage. The arms 277 pass directly over the universal bar 268 as shown in Fig. 32 and by depressing the space bar 276 the universal bar will be depressed and the ribbon controlling and escapement devices will be operated. The type carriage may thus be moved one space to the right and this operation may be repeated as many times as desired, without the type bars being operated.

The return key.

The return key operates a valve which controls the admission of air to the motor 183, which is, as hereinbefore explained, employed in the operation of returning the carriage, or moving it from right to left at the end of the operation of printing a line. The return key 281 is pivoted upon the shaft 258, which also forms the pivotal support for the letter keys, as hereinbefore described (see Fig. 30). This key is provided at its end with a hook 283 arranged to engage a valve 284 controlling the admission of air to one of the openings in the valve chamber 63, to which a tube 62 is attached. This tube is joined to the tube 241 that leads from the neutral key 250 to the motor 183 (see Figs. 29 and 36), and said motor is operated whenever the valve 284 is raised, as is done by depressing said return key.

The back spacer key.

The back spacer key 285 is also pivotally supported upon the shaft 258 and is provided with a hook 286 at its rearward end, engaging a valve 287 in the valve chamber 63. This valve controls the admission of air to the tube 62 leading to the motor 187. (See Figs. 29 and 36).

The stem of the back spacer key 285 is provided with a pin 288 which extends over the lever arm of the return key 281 (see Figs. 29 and 36). The result of this is that after the back spacer key has been depressed to a certain extent, and has opened the valve 287 controlled thereby, which has admitted air under said valve and has caused the motor 187 to be operated, the further movement of said key depresses the return key, opens the valve 284 and causes the motor 183 to be operated, as hereinbefore described.

I have already explained the operation of the motor 183 which is provided in connection with the mechanism for returning the carriage, and the motor 187 working in conjunction therewith for limiting the reverse movement of the carriage to a single space only.

The line spacer key.

The line spacer key 289 is shown in detail in Fig. 37. As before explained it passes over the universal bar 268 but does not operate said bar when it is depressed. It is pivoted upon the shaft 258 and is provided with a hook 289'' at its rearward end. This hook is similar to the hook on the back spacer key and this key operates a valve on the covering of one of the openings in the valve chamber 63, the valve being in all respects like the valve 287 that is operated by the back spacer key. This valve controls the admission of air to the tube 62 leading to the line spacing motor 207, and when this key is depressed said motor actuates the line spacing devices as hereinbefore described.

The type shift keys.

The two keys at the left of the key-board, as shown in Fig. 29, operate the double motor 82, which actuates the semi-circular shift bar 66. The key 289' is marked "Capitals", and the key 290 is marked "Figures". When the key 289 is depressed one part of the double motor is brought into operation and it moves the shift bar in a direction to cause "upper case" or capital letters to be printed. When the key marked "Figures" is depressed the other part of the motor moves the shift bar in the opposite direction and while this key is depressed the depressing of any letter key will cause the numeral or character marked on the key-cap or button of the key so depressed to be printed. These keys are pivoted upon the shaft 258. The key 289' is provided at its end with a hook 291 engaging a valve 292 covering an opening in the valve chamber 63 to which is connected a tube 91, leading to the motor 82. The key 290 is provided with a hook 293 engaging a valve 294 which covers an opening in the valve chamber which communicates with a tube 92 leading to the other part of the double motor 82.

Safety device for shift bar.

I prefer to provide means for locking the universal bar and thereby locking all of the letter keys out of action, while the shift bar is being moved in either direction. For this purpose I arrange directly below the universal bar and mounted in suitable bearings in the frame of the key-board a rock shaft 295. This shaft has mounted upon it by suitable hubs upwardly projecting arms 296, one of said arms being arranged near each end of the shaft and each arm having a broad upper end. A laterally projecting arm 297 is also connected to said shaft 295 preferably by being formed integrally with the hub that carries one of said arms 296, and a link 298 connects the arm 297 with the key lever 289'. When the parts are in normal position the arms 296 stand out of line with the universal bar as shown in Figs. 32 and 33. As soon as the movement of the "capital" key 289' begins, the end of the arm 296 is brought under the universal bar and said universal bar and the letter keys are locked against downward movement until the key 289' has been completely depressed, and the arm 296 has been rocked from the position indicated in Figs. 32 and 33 to the position indicated in Fig. 30. When the arm 296 reaches the position shown in Fig. 30 it will be clear of the universal bar, and said bar, or any letter key above said bar, may be depressed.

I prefer also to provide upon the hub of one of the arms 296 a lug 299, and to arrange upon the shaft 271 a dog 300 having its lower end in engagement with the hub of the said arm 296. A spring 301 holds this dog against said hub and when the arm 296 reaches the position shown in Fig. 30 and the "capital" shift key has been completely depressed, this dog will engage the lug 299 and lock said key in its depressed position and the arm 296 in the position shown in Fig. 30.

Said dog 300 has a horizontal arm 302 extending under one of the arms 270 that supports the universal bar 268. (See Fig. 29). As soon as any letter key is depressed or the universal bar is otherwise given a downward movement the engagement of said arm 270 with the lug 302 disengages the dog 300 from the lug 299 and permits the capital shift key to be elevated and the locking arms 296 to be returned to their normal position shown in Figs. 31, 32 and 33.

A substantially similar locking device is provided in connection with the other shift key 290. For this purpose a tube 303 is arranged upon the shaft 295 between the hubs of said arms 296, and this sleeve carries the arms 304, which stand normally in the position shown in Figs. 32 and 33 of the drawings. Said sleeve is provided with a laterally projecting lug 305 which is connected to the key lever by a pin 306 and a link 307. As soon as the downward movement of the key lever 290 begins the arms 304 are rocked under the universal bar and said bar is held against downward movement until this shift key has been completely depressed and the shifting device has completed its operation. I do not find it necessary, however, to provide a locking device for this key and as soon as it is released, as here shown, it will return to its normal position.

I prefer also to provide means that make it impossible to depress the key lever 290 marked "Figures" at the same time that the key levers 289 marked "Capitals" is being depressed. For this purpose I provide a lug 308 on the hub of one of the arms 296. This lug extends beneath the pin 306 to which the link 307 of the "figures" key is connected. When the key 289 is depressed this lug is brought under the pin 306 and prevents any downward movement of said pin and of the key 290 (see Fig. 30).

The book support.

The machine is preferably provided with a book support upon which a book may be placed and held in position to have the typewriting done on the surface of a leaf or sheet of the open book. The book support is shown clearly in Figs. 1, 2, 38, 39 and 40. The book support consists, essentially, of two plates 309 each mounted upon a post 310 arranged to slide vertically in a tubular guide 311. A spring 312 surrounds the post 310 and tends to hold the plate is an elevated position. These plates can be depressed unevenly to allow for the varying thicknesses of the parts of the book (see Fig. 38). The tubular supports 311 are preferably carried by a cross bar 313 having its ends suitably secured to the walls of the desk or table. Each of the plates 309 is preferably of circular form as shown in Fig. 1 and the posts 310 turn freely in their supports.

Extending across the machine in the rear of the book supports is a rod 314, and a platen 315 is hinged upon this rod, and is capable of sliding lengthwise thereon. The platen may thus be brought over either of the book supports according as it is desired to print upon the right-hand or left-hand page of the book. The platen is preferably of rectangular form and when in a horizontal position its forward edge rests upon a transverse rod 316, which extends across the desk in front of the book supports 309. The platen is preferably provided at its forward edge with a transversely extending bar 317 preferably riveted or otherwise secured to the under side of the platen and resting on top of the rod 316. The edge of the bar 317 preferably projects beyond the edge of the platen as shown in Fig. 40. The platen also preferably has a pad of rubber or other suitable material 318, secured to its upper surface. Secured to brackets 319 carried by the bearing blocks of the platen are the shafts 320 and 321, which extend parallel with the rod 314. Paper holders 322 and 323 are pivotally supported upon these shafts. Said holders are provided respectively with the long tubular bearings 324 and 325 (see Fig. 1). Said holders are also preferably provided with a series of holes 326 and a series of springs 327 are secured to said bars with their ends projecting through said holes and bearing with spring pressure upon the surface of the paper below. Each paper holder is provided at its forward edge with a latch 328 adapted to engage the edge of the bar 317 and to be held in proper position by a spring 329 and plunger 330.

To place the book in position for printing the platen is raised to a substantially upright position. It will rest against the bar 264 on the type carriage and will remain upright without being otherwise supported. The book is then placed on the two spring supports and opened at the desired page. The platen without the leaf holders is lowered onto the book. The opposite leaf is now turned over above and onto the platen and the book and platen are arranged so that the inner edge of the platen will come the desired distance from the middle of the open book. The platen is arranged so that it can be moved on its rear bearing from side to side and placed anywhere to furnish the best position as regards the page to be written upon. The platen is conveniently provided with handles 331 near its forward edge which may be grasped in raising or lowering the platen. The book can be varied a considerable distance upon its spring supports if it is not desired to adjust the platen. It is not necessary to raise the platen to an upright position to slide it from side to side but it can be moved if it is raised high enough from the book to clear it.

After the platen has been placed and the leaf to be written upon has been turned over onto the platen the paper holder nearest the center of the book is turned down over the leaf and as the inner edge of this paper holder is a straight edge, the book and leaf may be straightened by it and the proper margin may be provided for the end of the typewriter line nearest the center of the book. The other paper holder is then brought down into position on top of the page, care being taken to have the page perfectly smooth.

After the book has been properly placed upon the book support the carriages are drawn forward preferably by hand in the manner hereinbefore described and the type carriage is brought to the proper printing point and the operation of the machine is then proceeded with. After the page has been filled with typewriting the carriages are moved back, the platen is moved over the other book support, and the leaf is turned so as to bring the other surface uppermost, if both sides or pages of the leaf are to be written on. The paper holders are then brought into proper position, the carriages are brought forward, and the writing upon the side of the leaf now uppermost is carried on in the manner already described.

While this machine is adapted for writing upon the pages of bound books, it is equally adapted for writing upon loose sheets of paper, which may be placed upon the platen and held in position by the paper holders. The operation of the machine is the same whether it is used for writing upon such sheets of paper or upon the leaves of bound books.

It is thought that the operation of this machine will be fully understood from the foregoing detailed description of the mechanism, and that a detailed description of the operation is, therefore, unnecessary.

I have designated the main carriage as longitudinally movable and the type carriage as laterally movable, in the following claims. By this I mean that the main carriage moves on its supporting rails toward and from the key-board, and the type carriage moves at right angles to the movement of the main carriage.

It will be understood that the various parts of the mechanism may be modified in many particulars without departing from my invention, and I, therefore, do not limit myself to the details of the construction herein shown and described.

I claim as my invention:

1. The combination, in a typewriting machine, with a stationary key-board and a stationary book or paper support, of a longitudinally movable main carriage, a laterally movable type carriage arranged on said main carriage, a pneumatic motor arranged upon said main carriage for moving said main carriage toward the front of the machine to provide line spacing, and means actuated by a key upon said key-board for controlling the operation of said motor.

2. The combination, in a typewriting machine, with a stationary key-board and a stationary book or paper support, of a longitudinally movable main carriage, a laterally movable type carriage arranged on said main carriage, a pneumatic motor arranged upon said main carriage for moving said main carriage toward the front of the machine to provide line spacing, means actuated by a key upon said key-board for controlling the operation of said motor, and means for disconnecting the motor actuated mechanism from said main carriage to permit said main carriage to be moved freely in a reverse direction.

3. The combination, in a typewriting machine, with a stationary key-board and a stationary book or paper support, of a longitudinally movable main carriage, a laterally movable type carriage arranged on said main carriage, a pneumatic motor arranged upon said main carriage for moving said main carriage toward the front of the machine to provide line spacing, means actuated by a key upon said key-board controlling the operation of said motor, and an independent pneumatic motor for disengaging the motor actuated mechanism from said main carriage to permit said main carriage to be moved freely in a reverse direction.

4. The combination, in a typewriting machine, with a stationary key-board and a stationary book or paper support, of a longitudinally movable main carriage, a vacuum chamber provided on said main carriage, an air exhausting device arranged upon a stationary support, a flexible tube connecting said air exhausting device and said vacuum chamber, a pneumatic motor arranged upon said main carriage and connected with said vacuum chamber, means actuated by said pneumatic motor for advancing said main carriage, and means actuated by a key upon said key-board for controlling the operation of said pneumatic motor.

5. The combination, in a typewriting machine, with a stationary key-board and a stationary book or paper support, of a longitudinally movable main carriage, a vacuum chamber provided on said main carriage, an air exhausting device arranged upon a stationary support, a flexible tube connecting said air exhausting device and said vacuum chamber, a pneumatic motor arranged upon said main carriage and connected with said vacuum chamber, means actuated by said pneumatic motor for advancing said main carriage, means actuated by a key upon said key-board for controlling the operation of said pneumatic motor, and an independent pneumatic motor also arranged upon said main carriage and connected with said vacuum chamber for disengaging said motor actuating mechanism from said main carriage to permit said main carriage to be moved freely in a reverse direction.

6. The combination, in a typewriting machine, with a stationary key-board, and a stationary book or paper support, of a longitudinally movable main carriage, a laterally movable type carriage arranged on said main carriage, a series of type bars arranged upon said type carriage, a plurality of independent pneumatic motors on said type carriage for actuating said type bars and making a printing impression therefrom, and means operated by the keys upon said key-board for controlling said pneumatic motors.

7. The combination, in a typewriting machine, with a stationary key-board, and a stationary book or paper support, of a longitudinally movable main carriage, a laterally movable type carriage arranged on said main carriage, a series of type bars arranged upon said type carriage, a corresponding series of pneumatic motors on said type carriage, each motor being arranged to actuate one of said type bars and make a printing impression therefrom, a corresponding series of keys on said key-board, and means controlled by said keys and connected with said pneumatic motors whereby the operation of any key causes the pneumatic motor controlled thereby to actuate the corresponding type bar.

8. The combination, in a typewriting machine, with a stationary key-board and a stationary book or paper support, of a longitudinally movable main carriage, a laterally movable type carriage arranged on said main carriage, a series of type bars arranged upon said carriage, a vacuum chamber provided on said type carriage, an air exhausting device arranged upon a stationary support, flexible means connecting said air exhausting device and the vacuum chamber on the type carriage, a series of pneumatic motors arranged upon said type carriage and connected with said vacuum chamber, each motor being arranged to actuate one of said type bars, a corresponding series of keys on said key-board and means controlled by said keys and connected with said pneumatic motors whereby the operation of any key causes the pneumatic motor controlled thereby to actuate the corresponding type bar.

9. The combination, in a typewriting machine, with a type carriage having a series of type bars arranged in groups thereon, each group containing an upper case type bar, a lower case type bar, and a numeral or miscellaneous character type bar, of a series of pneumatic motors arranged upon said type carriage, one motor being provided for each group of type bars, and means causing each motor to actuate at will any one of the type bars of the corresponding group.

10. The combination, in a typewriting machine, with a stationary key-board and a stationary book or paper support, of a longitudinally movable main carriage, a laterally movable type carriage arranged on said main carriage, a series of type bars arranged in groups upon said type carriage, each group containing an upper case type bar, a lower case type bar, and a numeral or miscellaneous character type bar, an independent pneumatic motor on said type carriage for each group of type bars, a series of keys on said key-board, means controlled by said keys and connected with said pneumatic motors whereby the operation of any key causes the pneumatic motor controlled thereby to actuate one of the type bars of the corresponding group, and means actuated from said key-board to select from each group the type bar that is to be operated by the corresponding motor.

11. The combination, in a typewriting machine, with a type carriage having a series of type bars arranged in groups thereon, of a series of pneumatic motors arranged upon said type carriage, one motor being provided for each group of type bars, means causing each motor to actuate one of the type bars of the corresponding group to make a printing impression from the actuated type bar, and means selecting at will the type bar that will be actuated by the movement of the corresponding motor.

12. The combination, in a typewriting machine, with a type carriage having a series of type bars arranged in groups thereon, of a series of pneumatic motors arranged on said type carriage, one motor being provided for each group of type bars, means causing each motor to actuate at will one of the type bars of the corresponding group to make a printing impression from the actuated type bar, and independent pneumatic motors and means for controlling the same, and thereby selecting the type bar of each group that will be actuated by any operation of the corresponding group motor.

13. The combination, in a typewriting machine, with a type carriage having a series of type bars arranged in groups thereon, of a series of pneumatic motors arranged on said type carriage, one motor being provided for each group of type bars, keys controlling the operation of said motors, independent pneumatic motors, and shift keys controlling said independent motors, and thereby selecting a type bar of each group that will be actuated to make a printing impression by any operation of the corresponding group motor.

14. The combination, in a typewriting machine, with a type carriage having a series of type bars arranged in groups thereon, of a series of pneumatic motors arranged on said type carriage, one motor being provided for each group of type bars, keys controlling the operation of said motor, means causing said motors to normally operate the type bars carrying the lower case letters to make a printing impression therefrom, and means operated by suitable shift keys causing said motors to similarly operate any of the other type bars.

15. The combination, in a typewriting machine, with a type carriage having a series of type bars arranged in groups thereon, of a series of pneumatic motors arranged on said type carriage, one motor being provided for each group of type bars and arranged to operate said type bars to make a printing impression therefrom, keys controlling the operation of said motors, independent pneumatic motors arranged to change the connection between said first named motors and said type bars and shift keys controlling the operation of said independent motor.

16. The combination, in a typewriting machine, with a stationary keyboard and a stationary book or paper support, of a longitudinally movable main carriage, a laterally movable type carriage arranged thereon, a rotatable shaft mounted upon said main carriage, means for continuously driving said shaft, means operated from said shaft for moving said type carriage on said main carriage from left to right for letter spacing, a friction clutch between said continuously driven shaft and the carriage feeding device, an escapement connected with said feeding device and arranged to hold said type carriage stationary against the power exerted by said continuously moving shaft, and means, operated by certain of the keys of said key-board, to actuate said escapement and permit said carriage to be moved one letter space to the right each time a letter key or the space bar on said keyboard is operated.

17. The combination, in a typewriting machine with a stationary key-board, and a stationary book or paper support, of a longitudinally movable main carriage, a laterally movable type carriage arranged thereon, a rotatable shaft mounted upon said main carriage, means for continuously driving said shaft, irrespective of the position in which said main carriage may be, means operated from said shaft and including a friction clutch for moving said type carriage on said main carriage from left to right for letter spacing, an escapement connected with said feeding device and arranged to hold said type carriage stationary against the power exerted by said continuously moving shaft, and means operated from said keyboard to actuate said escapement and permit said carriage to be moved one letter space to the right each time a letter key or the space bar on said key-board is operated.

18. The combination, in a typewriting machine, with a laterally movable type carriage, of a rotatable shaft mounted on suitable bearings, means for continuously driving said shaft, means operated from said shaft including a friction clutch for moving said type carriage from left to right for letter spacing, an escapement connected with the carriage feeding device and arranged to hold said type carriage stationary against the power exerted by said continuously moving shaft, a pneumatic motor arranged to operate said escapement and permit said carriage to be moved one letter space to the right, and a key controlling said pneumatic motor.

19. The combination, in a typewriting machine, with a laterally movable type carriage, of a rotatable shaft, means for continuously driving said shaft, direct driving means, operated from said shaft and including a friction clutch, for moving said type carriage for letter spacing, an escapement connected with the carriage feeding device and arranged to hold said type carriage stationary against the power exerted by said continuously moving shaft, reverse driving means between said continuously moving shaft and said type carriage, pneumatic motors arranged to disconnect the direct and connect the reverse drive with said shaft, whereby said carriage may be returned by power to its initial position, a stationary key-board, tubes connecting said key-board with said motors, and keys controlling the admission of air to said tubes.

20. The combination, in a typewriting machine, with a laterally movable type carriage, of a continuously operating power device for moving said type carriage for letter spacing, direct and reverse driving connections between said power device and said type carriage, pneumatic motors controlling said driving connections, a stationary keyboard provided with valve chambers, tubes connecting said valve chambers and said motors, and keys governing the admission of air to said tubes.

21. The combination, in a typewriting machine, with a laterally movable type carriage, of a continuously operating power device for moving said type carriage for letter spacing, a reverse driving connection between said power device and said type carriage, means between said power device and said type carriage for bringing said reverse driving connection into operation, means permitting said type carriage to move in a reverse direction a distance exceeding a letter space, and means permitting the carriage thereafter to move ahead a sufficient distance to take up the amount of such excess.

22. The combination, in a typewriting machine, with a type carriage provided with a series of type bars, pneumatic motors connected with said type bars and arranged to operate the same, a stationary key-board, tubes connecting said key-board and said motors, valves controlling the admission of air to said tubes, keys on said key-board connected with said valves, and means for disconnecting each valve from the key levers and permitting the same to close automatically after each operation.

23. The combination, in a typewriting machine, with a suitable key-board, of a valve chamber, valves provided on said chamber, key levers connected with said valves for opening the same, and means automatically disconnecting said valve and said key levers at predetermined points in the movements of said levers.

24. The combination, in a typewriting machine, with a laterally movable type carriage, of a continuously operating driving device connected with said carriage, means permitting said carriage to be moved by said driving device from left to right for letter spacing, a pneumatic motor arranged to disconnect said driving device from said carriage, a stationary key-board, a tube connecting said key-board and said pneumatic motor, and a key arranged upon said key-board for admitting air to said tube and thereby controlling the operation of said motor.

25. The combination, in a typewriting machine, with a laterally movable type carriage, of a continuously operating driving device connected with said carriage, means permitting said carriage to be moved by said driving device from left to right for letter spacing, a pneumatic motor arranged to disconnect said driving device from said carriage, a neutralizing valve arranged upon said carriage and controlling the admission of air to said motor, and a push button upon said carriage arranged to open said valve whereby the operator may grasp the carriage for moving the same and at the same time operate said push button to free the carriage from its driving device.

26. The combination, in a typewriting machine, with a movable carriage, a stationary book or paper support and a stationary key-board, of a vacuum chamber arranged upon said carriage, an air exhausting device, a flexible tube connecting said air exhausting device with said vacuum chamber, a series of pneumatic motors arranged upon said type carriage and movable therewith, each of said motors being connected with said vacuum chamber and each of said motors being provided with a movable operating plate, tubes connecting said motors with said key-board, valves at said key-board controlling the admission of air to each of said tubes, and a key on said key-board controlling each of said valves.

27. The combination, in a typewriting machine, with a longitudinally movable carriage, a laterally movable type carriage, provided with a series of type bars, a stationary book or paper support and a stationary key-board, of a vacuum chamber arranged upon said main carriage, a second vacuum chamber arranged upon said type carriage, an air exhausing device arranged upon a stationary support, flexible tubes connecting said air exhausting device with each of said vacuum chambers, a series of pneumatic motors arranged upon said main carriage, and connected with the vacuum chamber thereon, a second series of pneumatic motors arranged upon said type carriage, and connected with the vacuum chamber thereon, a continuously acting power device connected with said type carriage for moving the same laterally, means actuated by the pneumatic motors on said main carriage for controlling the lateral movements of said type carriage for letter spacing, back spacing, and return, means actuated by the pneumatic motors on said type carriage for actuating said type bars, valve chambers provided upon said key-board, tubes connecting said valve chambers and said motors, valves controlling the admission of air through said chambers to said tubes, and keys for operating said valves.

In witness whereof, I have hereunto set my hand this 2nd day of January, 1915.

SEWARD A. DEAN.

Witnesses:
EDWARD A. PAUL,
GENEVIEVE E. SORENSEN.